United States Patent
Song et al.

(10) Patent No.: US 11,177,666 B2
(45) Date of Patent: Nov. 16, 2021

(54) STACKED COIL STRUCTURE AND ELECTRONIC DEVICE INCLUDING THE SAME

(71) Applicant: Samsung Electronics Co., Ltd., Suwon-si (KR)

(72) Inventors: Keumsu Song, Suwon-si (KR); Kwangseob Kim, Suwon-si (KR); Kihyun Kim, Suwon-si (KR); Dongzo Kim, Suwon-si (KR); Jiwon Kim, Suwon-si (KR); Jihye Kim, Suwon-si (KR); Yunjeong Noh, Suwon-si (KR); Changhak O, Suwon-si (KR); Hyungkoo Chung, Suwon-si (KR); Mincheol Ha, Suwon-si (KR); Jongchul Hong, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 16/444,409

(22) Filed: Jun. 18, 2019

(65) Prior Publication Data
US 2020/0006949 A1   Jan. 2, 2020

(30) Foreign Application Priority Data

Jun. 27, 2018 (KR) .................... 10-2018-0074039

(51) Int. Cl.
*H01F 17/00* (2006.01)
*H01F 38/14* (2006.01)
(Continued)

(52) U.S. Cl.
CPC .......... *H02J 5/005* (2013.01); *H01F 17/0013* (2013.01); *H01F 38/14* (2013.01);
(Continued)

(58) Field of Classification Search
USPC ........................................................ 307/104
See application file for complete search history.

(56) References Cited

U.S. PATENT DOCUMENTS

2012/0049991 A1   3/2012   Baarman et al.
2013/0015719 A1   1/2013   Jung et al.
(Continued)

FOREIGN PATENT DOCUMENTS

| KR | 10-2015-0057963 A | 5/2015 |
| KR | 10-2017-0140666 A | 12/2017 |
| WO | 2017/094367 A1 | 6/2017 |

OTHER PUBLICATIONS

European Search Report dated Mar. 25, 2021, issued in European Application No. 19824534.2.
(Continued)

*Primary Examiner* — Toan T Vu
*Assistant Examiner* — Xuan Ly
(74) *Attorney, Agent, or Firm* — Jefferson IP Law, LLP

(57) ABSTRACT

An electronic device is provided. The electronic device includes a coil unit, a power transmission circuit electrically connected to the coil unit, and a control circuit configured to wirelessly transmit power using the coil unit, and the coil unit may include a first coil. The first coil may include a first layer wound in a first shape by a first number of turns, and a second layer extending from the first layer and wound in a second shape by a second number of turns, and the second layer may be disposed above the first layer to overlap the first layer.

20 Claims, 9 Drawing Sheets

(51) Int. Cl.
*H02J 5/00* (2016.01)
*H02J 50/12* (2016.01)
*H02J 50/40* (2016.01)
*H02J 50/70* (2016.01)
*H02J 7/02* (2016.01)
*H04B 5/00* (2006.01)

(52) U.S. Cl.
CPC .............. *H02J 7/025* (2013.01); *H02J 50/12* (2016.02); *H02J 50/40* (2016.02); *H02J 50/70* (2016.02); *H04B 5/0037* (2013.01)

(56) References Cited

U.S. PATENT DOCUMENTS

| | | |
|---|---|---|
| 2015/0145340 A1 | 5/2015 | Chiyo |
| 2015/0145341 A1 | 5/2015 | Chiyo et al. |
| 2015/0332845 A1 | 11/2015 | Werner et al. |
| 2016/0099576 A1 | 4/2016 | Ho et al. |
| 2017/0345548 A1 | 11/2017 | Yu et al. |
| 2017/0353054 A1* | 12/2017 | Lee ...................... H05B 6/1236 |
| 2018/0358168 A1* | 12/2018 | Furiya .................... H01F 27/24 |

OTHER PUBLICATIONS

International Search Report with Written Opinion dated Sep. 20, 2019; International Appln. No. PCT/KR2019/007129.

\* cited by examiner

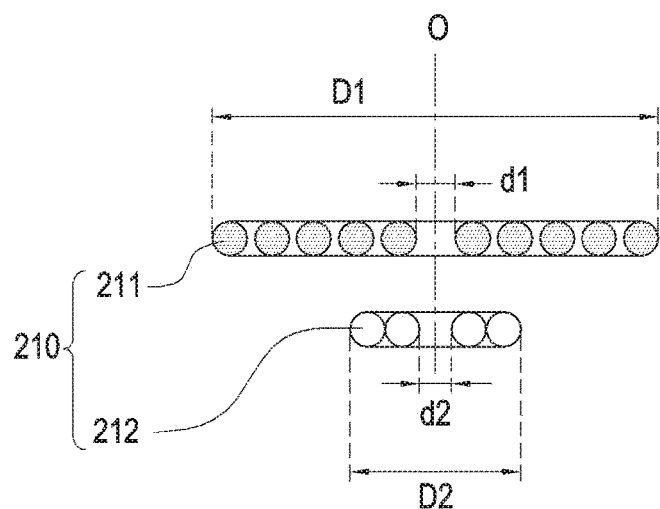
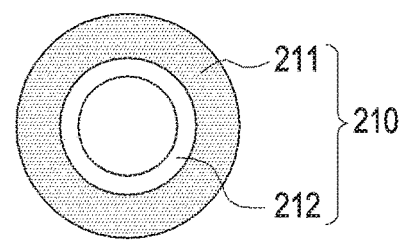
FIG.3A  FIG.3B
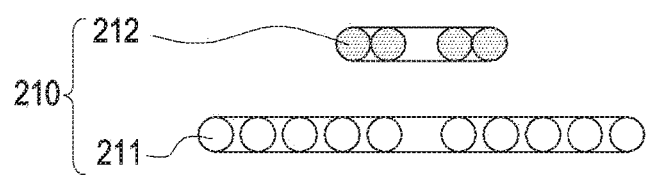
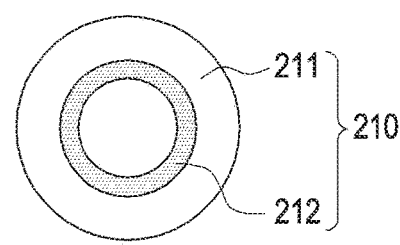
FIG.4A  FIG.4B

STACKED COIL STRUCTURE AND ELECTRONIC DEVICE INCLUDING THE SAME

CROSS-REFERENCE TO RELATED APPLICATION(S)

This application is based on and claims priority under 35 U.S.C. 119(a) of a Korean patent application number 10-2018-0074039, filed on Jun. 27, 2018, in the Korean Intellectual Property Office, the disclosure of which is incorporated by reference herein in its entirety.

BACKGROUND

1. Field

The disclosure relates to a coil structure and an electronic device including the coil structure. More particularly, the disclosure relates to an arrangement structure between coils for wireless power transmission and an electronic device including the arrangement structure.

2. Description of the Related Art

Recently, with the rapid development of information communication technology, a society based on information communication technology is being formed. In addition, in an information-based society, the importance of sensors embedded in electronic devices and power supply problems is increasingly emphasized in order for information communication devices to operate and connect with each other regardless of time or place.

Generally, as the types of mobile devices such as mobile phones have been rapidly diversified, the operation of charging the batteries of mobile devices requires users' time and labor. As a way to solve this problem, wireless power transmission technology has recently attracted attention. For example, a wireless power reception device, such as a mobile device that receives energy wirelessly, may be driven by the received wireless power, or may be driven using power, which has been charged to a battery using the received wireless power.

Wireless power transmission technology (wireless power transmission or wireless energy transfer) is technology for transmitting electric energy from a transmitter to a receiver wirelessly using the induction principle of a magnetic field. The wireless energy transmission scheme may be largely classified into a magnetic induction scheme, an electromagnetic resonance scheme, and a power transmission scheme using a short-wavelength radio frequency.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for selective wireless power transmission to two or more electronic devices.

As the application range of wireless power transmission technology is gradually widening, there is a need for a wireless power transmission device capable of selectively transmitting wireless power to two or more electronic devices.

Another aspect of the disclosure is to provide an electronic device that is capable of improving wireless power transmission efficiency and is capable of minimizing heat generation through diversification of an arrangement structure between stacked coils and the number of coil turns.

Another aspect of the disclosure is to provide an electronic device capable of selectively wirelessly charging different kinds of apparatus through various arrangements between coils. For example, by arranging a compatible charging area, electronic device such as a mobile phone and a wearable device such as a watch can be selected and charged.

Another aspect of the disclosure is to improve the design flexibility of the inside of an electronic device, to improve mounting efficiency while maintaining the performance of the wireless power transmission, through the overlapping and/or embedded arrangements of a plurality of coils.

Additional aspects will be set forth in part in the description which follows and, in part, will be apparent from the description, or may be learned by practice of the presented embodiments.

In accordance with an aspect of the disclosure, an electronic device is provided. The electronic device includes a coil unit, a power transmission circuit electrically connected to the coil unit, and a control circuit set to wirelessly transmit power using the coil unit, which may include a first coil. The first coil may include: a first layer wound in a first shape by a first number of turns; and a second layer extending from the first layer and wound in a second shape by a second number of turns, the second layer being disposed above the first layer to overlap the first layer.

In accordance with an aspect of the disclosure, an electronic device is provided. The electronic device includes a coil unit, a power transmission circuit electrically connected to the coil unit, and a control circuit set to wirelessly transmit power using the coil unit. The coil unit may include a first coil wound in a first shape by a first number of turns, the first shape including a first layer and a second layer having an area narrower than the area of the first layer, and a second coil wound in a second shape by a second number of turns, the second coil being disposed above the first layer to overlap at least a portion of the first layer.

In accordance with an aspect of the disclosure, an electronic device is provided. The electronic device includes a power transmission circuit set to generate power to be wirelessly transmitted, and a coil assembly electrically connected to the power transmission circuit and configured to wirelessly transmit the power. The coil assembly may include a first coil module including a first coil wound by a first number of turns, and a second coil wound by a second number of turns smaller than the first number of turns in a state of being electrically connected to the first coil and disposed above the first coil, and a second coil module including a third coil wound by a third number of turns and disposed above the first coil adjacent to the second coil in a state in which a portion thereof overlaps the first coil, and a fourth coil wound by a fourth number of turns smaller than the third number of turns in a state of being electrically connected to the third coil and disposed below the third coil adjacent to the first coil.

In accordance with an aspect of the disclosure, an electronic device is provided. The electronic device includes a power transmission circuit set to generate power to be wirelessly transmitted, and a coil assembly electrically connected to the power transmission circuit and configured to wirelessly transmit the power. The coil assembly may include a first coil wound by a first number of turns, a second coil wound by a second number of turns smaller than the first number of turns and disposed above the first coil, a third coil wound by a third number of turns and disposed above the first coil adjacent to the second coil in the state in which a portion thereof overlaps the first coil, and a fourth coil wound by a fourth number of turns smaller than the third number of turns and disposed below the third coil adjacent to the first coil.

According to various embodiments, it is possible to provide an electronic device that is capable of transmitting wireless power through different kinds of coils that are compatible with a first external electronic device and a second external electronic device.

According to various embodiments, in an electronic device, it is possible to improve wireless power transmission efficiency through diversification of an arrangement structure between stacked coils and the number of turns of the coils.

An electronic device according to various embodiments includes a charging region for an electronic device such as a portable phone and a charging region for a wearable device. Thus, it is possible to wirelessly charge different kinds of wireless devices using the charging regions selectively or simultaneously.

An electronic device according to various embodiments is able to secure wireless power transmission performance, to improve design flexibility of the inside of the electronic device, and to improve mounting efficiency through overlapping and/or embedded arrangement of a plurality of coils.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A is a schematic view illustrating a cross section of a first coil of a coil unit according to various embodiments of the disclosure;

FIG. 3B is a schematic view illustrating a top face of a first coil of a coil unit according to various embodiments of the disclosure;

FIG. 4A is a schematic view illustrating a cross section of a first coil of a coil unit according to another embodiment of the disclosure;

FIG. 4B is a schematic view illustrating a top face of a first coil of a coil unit according to another embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
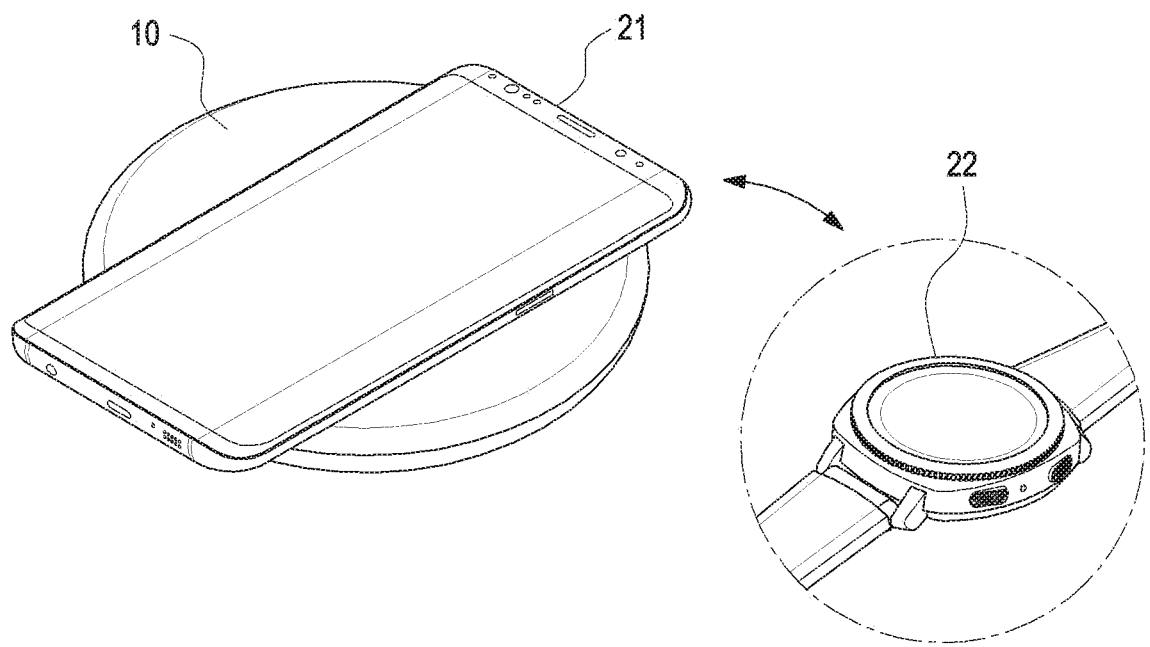
FIG. 1 is a perspective view illustrating an electronic device that transmits power, various electronic devices that receive transmitted power according to an embodiment of the disclosure.

FIG. 1 is a perspective view illustrating an electronic device that transmits power, various electronic devices that receive transmitted power according to various embodiments of the disclosure.

Referring to FIG. 1, an electronic device 10 (e.g., the electronic device 1502 or 1504 in FIG. 15) may be a wireless power transmission device that transmits power wirelessly. For example, the electronic device 10 may be a power delivery device that delivers power required by various reception devices that receive wireless power. As another example, the electronic device 10 may be a wireless charging device that charges the battery of a wireless power reception device 21 or 22 (e.g., the electronic device 1501 in FIG. 15) by delivering power wirelessly.

According to various embodiments, the electronic device 10 may be implemented as various types of devices that deliver wireless power to a wireless power reception device 21 or 22 that requires power. As another example, the electronic device 10 may selectively provide wireless power to different types of wireless power reception devices 21 or 22.

According to various embodiments, the wireless power reception device 21 or 22 is a device capable of operating by receiving power wirelessly from the electronic device 10. As another example, the wireless power reception device 21 or 22 may charge a mounted battery using the received wireless power.

According to various embodiments, the wireless power reception device 21 or 22 that receives wireless power may include any types of electronic devices, such as a portable phone, a cellular phone, a smart phone, a wearable device (e.g., a watch), a keyboard, a mouse, a tablet, or a multimedia device, as well as an input/output device such as a keyboard, a mouse, an input/output device such as an auxiliary video or audio output device, a personal digital assistant (PDA), a portable multimedia player (PMP), a tablet, or a multimedia device.

According to various embodiments, the electronic device 10 may deliver power wirelessly to the wireless power reception device 21 or 22 using at least one wireless power delivery method. For example, the electronic device 10 may deliver power using at least one of an inductive coupling scheme based on a magnetic induction phenomenon by wireless power signals and a magnetic resonance coupling scheme based on an electromagnetic resonance phenomenon by wireless power signals of a specific frequency.

According to an embodiment, the wireless power transmission by the inductive coupling scheme is a technique of wirelessly transmitting power using a primary coil and a secondary coil, and may be a scheme of delivering power by a magnetic induction phenomenon in which, through a magnetic field changing in one coil, current is induced in another coil. As another example, wireless power transmission by the resonance coupling scheme may be a scheme of causing resonance to occur in the wireless power reception device 21 or 22 by wireless power signals transmitted from the electronic device 10 and delivering power from the electronic device 10 to the wireless power reception device 21 or 22 by the resonance phenomenon.

Figure 2:
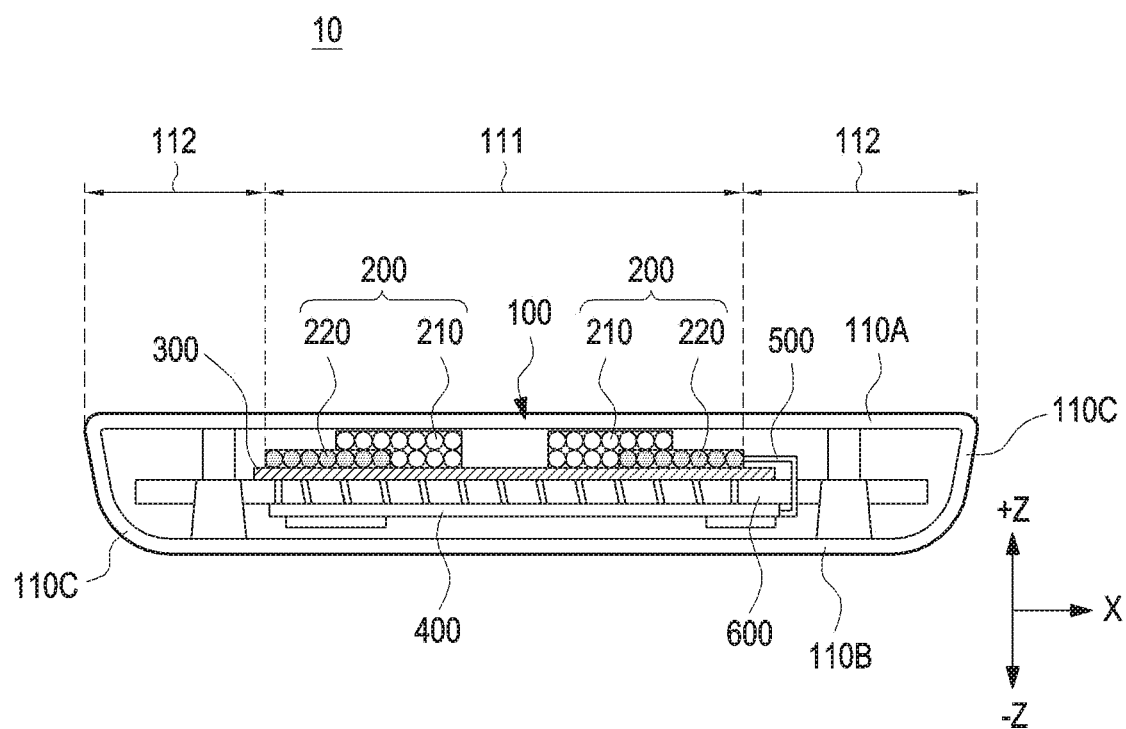
FIG. 2 is a cross-sectional view illustrating internal components of an electronic device that transmits wireless power, according to an embodiment of the disclosure.

FIG. 2 is a cross-sectional view illustrating the internal components of an electronic device that transmits wireless power, according to various embodiments of the disclosure.

The electronic device 10 of FIG. 2 may be at least partially the same as the electronic device 10 of FIG. 1.

In FIG. 2, "X" in a 2-axis orthogonal coordinate system may indicate the radial direction of the electronic device 10, and "Z" may indicate the thickness direction of the electronic device 10. In an embodiment, "Z" may indicate a first direction (+Z) or a second direction (−Z).

Figure 14:
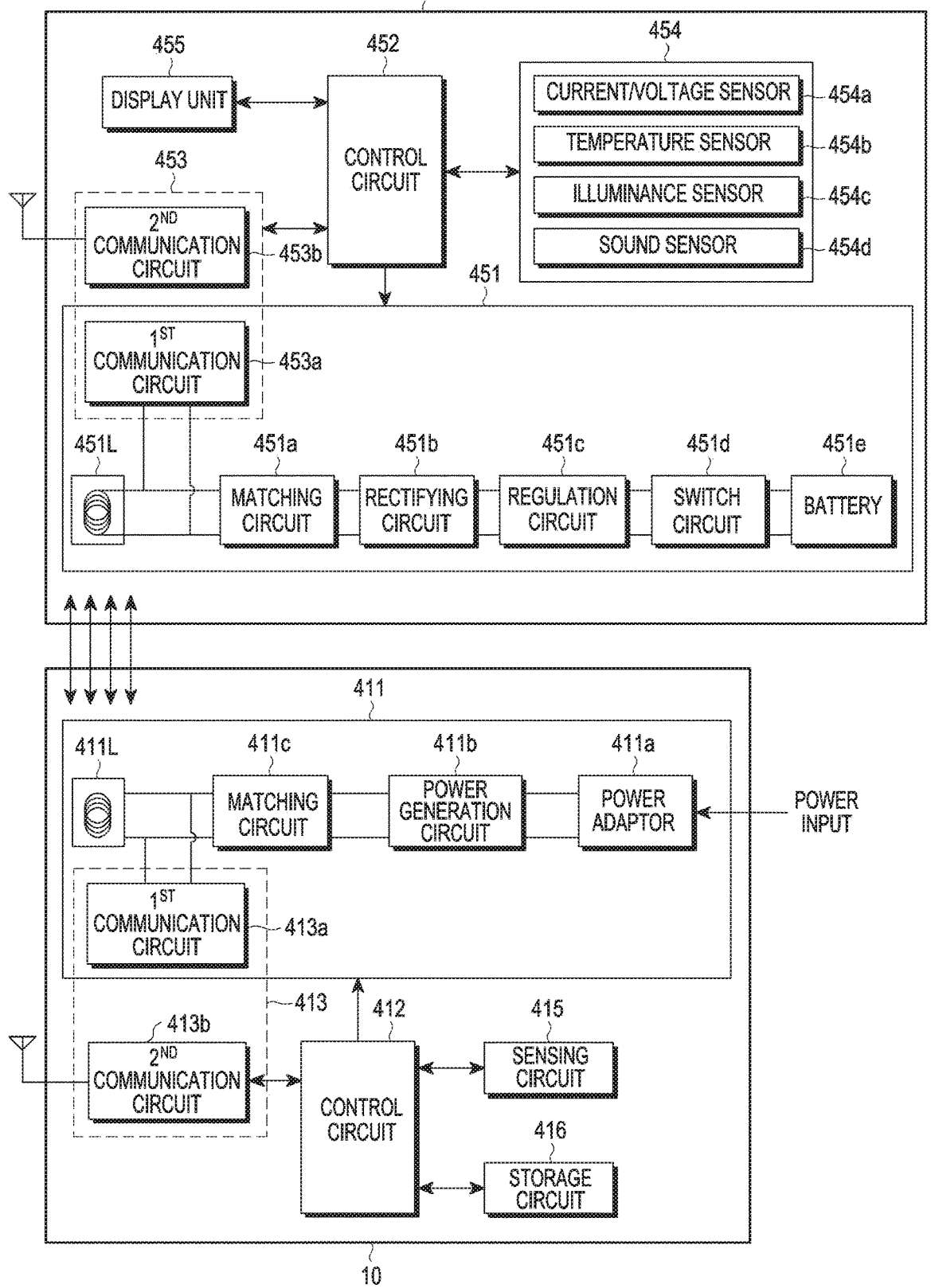
FIG. 14 is a block diagram of a wireless charging system according to various embodiments of the disclosure.

Referring to FIG. 2, the electronic device 10 may include a housing 100, a coil unit 200 (e.g., a coil assembly), a shielding member 300, a circuit board 400 including a control circuit (e.g., the control circuit 412, the communi-cation circuit 413, the sensing circuit 415, or the storage circuit 416 in FIG. 14), or a power transmission circuit 500 (e.g., a power transmission circuit 411 in FIG. 14). As another example, the electronic device 10 may include a fan (not illustrated) positioned on one face of an inner housing 600 and dissipating heat generated from the coil unit 200 and the circuit board 400.

According to an embodiment, the electronic device 10 may include a housing 100 including a first face (or the front face) 110A oriented in a first direction (+Z), a second face (or the rear face) 110B oriented in a second direction (−Z) opposite to the first direction (+Z), and a side face 110C surrounding a space between the first face 110A and the second face 110B. In another embodiment (not illustrated), the term "housing 100" may refer to a structure forming a part of the first face 110A, the second face 110B, and the side face 110C of FIG. 2. According to an embodiment, at least a part of the first face 110A, the second face 110B, and the side face 110C may be formed of a substantially opaque plate. The plate may be formed of, for example, coated or colored glass, ceramics, polymer, metal (e.g., aluminum, stainless steel (STS), or magnesium), or a combination of at least two of these materials.

According to an embodiment, the electronic device 10 may include a coil-mounting region 111 in which the coil unit 200 is disposed and a support region 112 other than the coil-mounting region 111. The coil-mounting region 111 is disposed in the center portion of the electronic device 10 so as to allow the coil unit 200 to be mounted therein and the support region 112 is disposed at an edge region of the coil-mounting region 111 so as to support the electronic device 10 thereon.

According to an embodiment, the rear face of the housing 100 may include a region extending seamlessly from the second face 110B toward the side face 110C. As another example, the first face 110A and/or the second face 110B of the housing 100 may be formed in the form of a circle, an ellipse, or a polygon.

According to an embodiment, the electronic device 10 may include a coil unit 200 disposed within the housing 100 and configured to transmit wireless power. For example, the coil unit 200 may be disposed in the coil-mounting region 111, which is the center region of the electronic device 10.

According to an embodiment, the coil unit 200 may include a designated first coil 210 by a first number of turns and a designated second coil 220 by a second number of turns. The first coil 210 includes a wire implemented in a helical form in which a plurality of layers are stacked and arranged, and may be implemented in the form of a part of at least one of a circle, an ellipse, or a polygon. The first coil 210 may be provided in the form in which an opening is provided in the inner center thereof, and a wire (e.g., a power transmission circuit 500) extending from the inner diameter end and/or the outer diameter end thereof may be electrically connected to the circuit board 400.

According to an embodiment, the second coil 220 may include at least one layer, and may be coplanar with at least one layer of the first coil 210. The second coil 220 may include a conductive wire in a helical form, and may be implemented as a part of at least one of a circle, an ellipse, or a polygon. The second coil 220 may be provided in the form in which an opening is provided in the inner center thereof, and a wire (e.g., a power transmission circuit 500) extending from the inner diameter end and/or the outer diameter end thereof may be electrically connected to the circuit board 400.

According to an embodiment, the first coil 210 and the second coil 220 may transmit wireless power to different electronic devices. For example, the outer diameter of the first coil 210 may be smaller than the outer diameter of the second coil 220. Wireless power transmitted from the first coil 210 may charge a battery of a wearable device (e.g., a watch) seated on the power transmission region (e.g., coil-mounting region 111) facing the region in which the first coil 210 is disposed. As another example, wireless power transmitted from the second coil 220 may charge a battery of a device having the same size as the smart phone and seated on the power transmission region (e.g., coil-mounting region 111) facing the region in which the second coil 220 is disposed.

According to various embodiments, the electronic device 10 may include a shielding member 300 disposed inside the housing 100 and below the coil unit 200. The shielding member 300 may be disposed between the circuit board 400 and the coil unit 200 so as to shield the circuit board 400 such that the magnetic field generated in the coil unit 200 is not directed toward the circuit board 400. As another example, the shielding member 300 may be disposed between the circuit board 400 and the coil unit 200 so as to shield electronic components and/or sensors disposed on the circuit board 400 such that the electronic components and/or the sensors do not directly face or come into contact the coil unit 200.

According to an embodiment, the shielding member 300 may be provided in a size corresponding to the entire area of the coil unit 200 and as a layer shielding the rear face of the coil unit 200. The shielding member 300 may be for example, a cushion member, an emboss member, or a copper (CU) sheet, and may be formed in a black color.

According to various embodiments, the electronic device 10 may include a circuit board 400 disposed inside the housing 100 opposite the coil unit 200 with the shielding member 300 interposed therebetween. On the circuit board 400, a processor, a memory, and/or an interface may be mounted. The processor may include one or more of, for example, a central processing unit (CPU), an AP, a graphic processor, an image signal processor (ISP), a sensor hub processor, or a communication processor (CP). The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect, for example, the electronic device 10 to an external electronic device, and may include a USB connector, an SD card/an MMC connector, or an audio connector.

According to an embodiment, on the circuit board 400, a communication module, a power management module, and the like may be mounted in the form of an integrated circuit chip. As another example, a control circuit (not illustrated) may also be configured as an integrated circuit chip to be mounted on the circuit board 400. For example, the control circuit may be a portion of the above-described processor or communication module. As another example, the control circuit may be set to transmit power wirelessly using the coil unit 200.

According to various embodiments, the electronic device 10 may include a power transmission circuit 500 that is disposed inside the housing 100 and that is a region of the wire extending from the coil unit 200. The power transmission circuit 500 may be connected to the circuit board 400 via a wire extending from the first coil 210 and/or the second coil 220. An end portion of the power transmission circuit 500 may include a configuration for electrical connection to the circuit board 400 (e.g., a coaxial cable connector, a Board-to-Board (B-to-B) connector, or a short pad).

According to various embodiments, the electronic device 10 may include a cooling fan (not illustrated) disposed within the housing 100. The inner housing may support the inner structures of the electronic device 10 such as the coil unit 200 and the circuit board 400, and the cooling fan may be located on one face of the inner housing. The cooling fan may cause a flow of air inside the housing 100 to circulate to the outside such that the heat generated in the housing 100 is dissipated to the outside. For example, it is possible to provide a flow of air such that heat generated in the coil unit 200 or the circuit board 400 can be dissipated through an opening formed in one face of the housing 100.

According to various embodiments, the electronic device 10 may include at least one of a sensor module (not illustrated), a key input device (not illustrated), a light-emitting element (not illustrated), and a connector hole (not illustrated). In some embodiments, in the electronic device 10, at least one of the components (e.g., the key input device or the light-emitting element) may be omitted, or other components may be additionally included. According to an embodiment, the sensor module may sense a wireless power reception device (e.g., the wireless power reception device 21 or 22 in FIG. 1) approaching the electronic device 10, or may generate an electrical signal or a data value corresponding to an internal operation state of the electronic device 10 or an external environmental condition. The light-emitting element may be disposed, for example, on the first face 110A or the side face 110C of the housing 100 to provide the state information of the electronic device 10 in an optical form. The connector hole may include a connector hole capable of accommodating a connector (e.g., a USB connector) for transmitting or receiving power and/or data to or from an external electronic device.

FIG. 3A is a schematic view illustrating a cross section of a first coil of a coil unit according to various embodiments of the disclosure. FIG. 3B is a schematic view illustrating the top face of the first coil of the coil unit according to various embodiments of the disclosure.

Referring to FIGS. 3A and 3B, the coil unit 200 within the electronic device may include a designated first coil 210 by a first number of turns and a designated second coil 220 by a second number of turns. The configuration of the first coil 210 of FIGS. 3A and 3B may be at least partially the same as the configuration of the first coil 210 of the coil unit 200 of FIG. 2.

According to various embodiments, the first coil 210 may be disposed such that a plurality of layers 211 and 212 are stacked. For example, the first coil 210 may include a first layer 211 wound in a first shape by a first number of turns and a second layer 212 extending from the first layer 211 and wound in a second shape by a second number of turns.

According to various embodiments, with reference to the first face (e.g., the first face 110A in FIG. 2) of the electronic device (e.g., the electronic device 10 in FIG. 2), the first coil 210 may include a first layer 211 and a second layer 212 disposed below the first layer 211. The first layer 211 and the second layer 212 are connected to each other, and may be provided as a flat helical coil having a multilayer structure.

According to various embodiments, the first shape of the first layer 211 may be a ring shape in which one wire is wound in a helical shape, and the second shape of the second layer 212 may be a ring shape in which one wire is wound in a helical shape and may have an area smaller than that of the first layer 211 wound in the ring shape. As another example, the first shape of the first layer 211 and/or the second shape of the second layer 212 may have a shape of a part of at least one of a circle, an ellipse, or a polygon.

According to various embodiments, at least a portion of the first layer 211 may be disposed to overlap at least a portion of the second layer 212. For example, the outer diameter D1 of the first layer 211 may be larger than the outer diameter D2 of the second layer 212, and the inner diameter d1 of the first layer 211 may be larger than the inner diameter d2 of the second layer 212. The central axis O of the first layer 211 and the central axis O of the second layer 212 are arranged on the same line, and the region adjacent to the inner diameter d1 of the first layer 211 may be disposed to overlap the region adjacent to the inner diameter d2 of the second layer 212. As another example, the central axis O of the first layer 211 and the central axis O of the second layer 212 are arranged parallel to each other within a designated distance depending on a design tolerance.

According to various embodiments, the first number of turns of the first layer 211 may be larger than the second number of turns. For example, the first layer 211 may have a structure in which a wire is helically wound at least five times around the central axis O, and the second layer 212 may have a structure in which a wire is helically wound at least two times around the central axis O. However, the number of turns of the first layer 211 and/or the number of turns of the second layer 212 is not limited thereto, and it is possible to change the design to various numbers of turns capable of maximizing the wireless power transmission efficiency.

According to various embodiments, in the first coil 210, the inner diameter d2 of the second layer 212 may be equal to or smaller than the inner diameter d1 of the first layer 211 when viewed from above the first layer 211. When the inner diameter d2 of the second layer 212 is smaller than the inner diameter d1 of the first layer 211, at least a portion of the second layer 212 may be exposed, as illustrated in FIG. 3B.

FIG. 4A is a schematic view illustrating a cross section of a first coil of a coil unit according to another embodiment of the disclosure. FIG. 4B is a schematic view illustrating a top face of the first coil of the coil unit according to another embodiment of the disclosure.

Referring to FIGS. 4A and 4B, the coil unit 200 within the electronic device may include a first coil 210 wound at a designated first number of turns and a second coil 220 wound by a designated second number of turns. The configuration of the first coil 210 of FIGS. 4A and 4B may be at least partially the same as the configuration of the first coil 210 of the coil unit 200 of FIG. 2 and FIGS. 3A and 3B.

According to various embodiments, the first coil 210 may be disposed such that a plurality of layers 211 and 212 are stacked. For example, the first coil 210 may include a first layer 211 wound in a designated first shape by a first number of turns and a second layer 212 extending from the first layer 211 and wound in a second designated shape by a second number of turns. FIGS. 4A and 4B are views illustrating an arrangement relationship between the first layer 211 and the second layer 212 of the first coil 210, which is different from that in FIGS. 3A and 3B, and descriptions will be focused on a different configuration.

According to various embodiments, with reference to the first face (e.g., the first face 110A in FIG. 2) of the electronic device (e.g., the electronic device 10 in FIG. 2), the first coil 210 may include a second layer 212 and a first layer 211 disposed below the second layer 212. The second layer 212 and the first layer 211 are connected to each other, and may be provided as a flat helical coil having a multilayer structure.

According to various embodiments, the first shape of the first layer 211 may be a ring shape in which one wire is wound in a helical shape, and the second shape of the second layer 212 may be a ring shape in which one wire is wound in a helical shape and may have an area smaller than that of the first layer 211 wound in the ring shape.

According to various embodiments, in the first coil 210, the outer diameter of the first layer 211 may be equal to or larger than the outer diameter of the second layer 212 when viewed from above the second layer 212. When the outer diameter of the first layer 211 is larger than the outer diameter of the second layer 212, the wire deposed in the region adjacent to the outer diameter of the second layer 212 may be exposed to the top face (or rear face) of the first coil 210, as illustrated in FIG. 4B.

Figure 5:
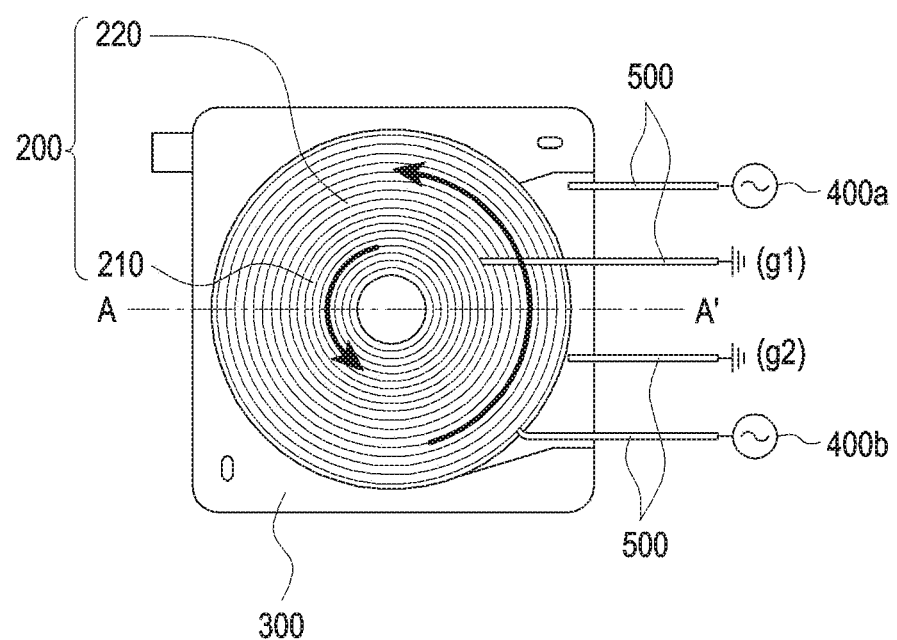
FIG. 5 is a top view specifically illustrating a shape of a coil unit according to various embodiments of the disclosure.
Figure 6:
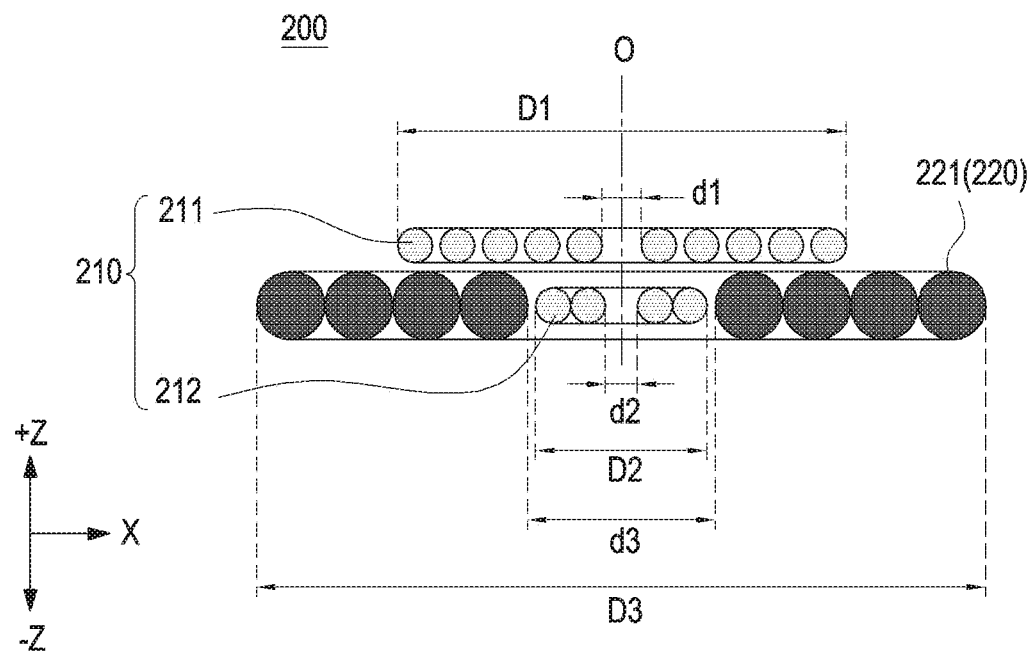
FIG. 6 is a schematic view showing cross sections of a first coil and a second coil of a coil unit according to various embodiments of the disclosure.
Figure 7:
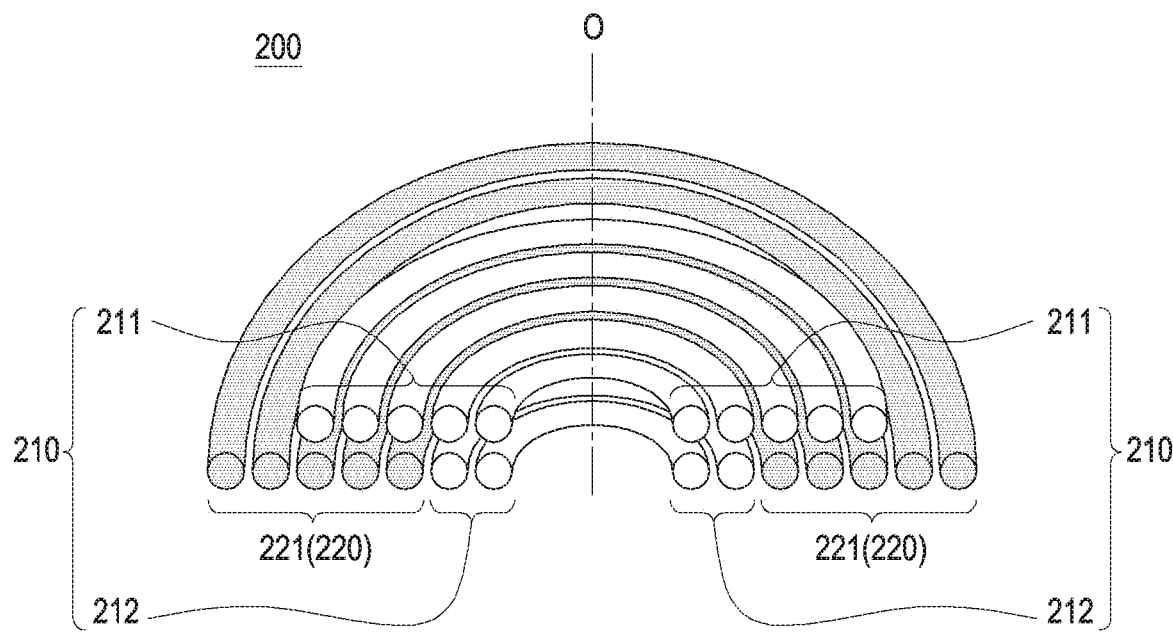
FIG. 7 is a perspective view illustrating a cross section of a coil unit of FIG. 5, which is taken along line A-A' according to various embodiments of the disclosure.

FIG. 5 is a top view specifically illustrating the shape of a coil unit according to various embodiments of the disclosure. FIG. 6 is a schematic view showing cross sections of a first coil and a second coil of a coil unit according to various embodiments of the disclosure. FIG. 7 is a perspective view illustrating a cross section of the coil unit of FIG. 5, which is taken along line A-A' according to various embodiments of the disclosure.

Referring to FIGS. 5 to 7, a coil unit 200 within an electronic device may include a first coil 210 by a first number or a second number of turns and a second coil 220 by a third number of turns. The configuration of the first coil 210 in FIGS. 5 to 7 may be at least partially the same as the configuration of the first coil 210 of the coil unit 200 in FIG. 2 and FIGS. 3A and 3B, and the configuration of the second coil 220 in FIGS. 5 to 7 may be at least partially the same as the configuration of the second coil 220 in FIG. 2.

In FIG. 6, "X" in a 2-axis orthogonal coordinate system may indicate the radial direction of the coil unit 200, and "Z" may indicate the thickness direction of the coil unit 200. In an embodiment, "Z" may indicate a first direction (+Z) or a second direction (−Z).

According to various embodiments, each of the first coil 210 and the second coil 220 may include one or more layers, and at least some layers of the second coil 220 may be stacked on at least some layers of the first coil 210.

According to various embodiments, each of the first coil 210 and the second coil 220 may be connected to a circuit board (e.g., the circuit board 400 in FIG. 2) to receive power. For example, a wire extending along an end portion of the first coil 210 may be connected to a first source 400a of the circuit board 400 to receive electric power, and a wire extending along the other end portion may form a ground portion g1. As another example, a wire extending along an end portion of the second coil 220 may be connected to a second source 400b of the circuit board 400 to receive electric power, and a wire extending along the other end portion may form a ground portion g2. According to various embodiments, the first source 400a and the ground unit g1 may be a first input terminal and a second input terminal of a first power source, and the second source 400b and the ground unit g2 of a second power source.

According to various embodiments, the first coil 210 and the second coil 220 may be wound in the same direction to provide current flow in the same direction. For example, by being wound in the counterclockwise direction, the first coil 210 is able to provide current flowing counterclockwise. For example, by being wound in the counterclockwise direction, the second coil 220 is able to provide current flowing counterclockwise.

According to various embodiments, the first coil 210 may be disposed such that a plurality of layers 211 and 212 are stacked. For example, the first coil 210 may include a first layer 211 wound in a designated first shape by a first number of turns and a second layer 212 extending from the first layer 211 and wound in a designated second shape by a second number of turns. According to an embodiment, one layer of the second coil 220 may be disposed adjacent to the first coil 210. For example, the second coil 220 may include a third layer 221 wound in a designated third shape by a third number of turns.

According to an embodiment, the second coil 220 may be a coil conforming to a wireless power consortium (WPC) standard. As another example, the first coil 210 and the second coil 220 may be coils conforming to a WPC standard.

According to various embodiments, with reference to the first face (e.g., the first face 110A in FIG. 2) of the electronic device (e.g., the electronic device 10 in FIG. 2), the first coil 210 may include a first layer 211 and a second layer 212 disposed below the first layer 211 (e.g., in the second direction (−Z)). The first layer 211 and the second layer 212 are connected to each other, and may be provided as a flat helical coil having a multilayer structure.

According to an embodiment, the second coil 220 may be disposed on a shielding member (e.g., the shield member 300 in FIG. 2) of the electronic device 10. According to an embodiment, the second layer 212 of the first coil 210 may be disposed on the shielding member 300. For example, the second layer 212 of the first coil 210 and the third layer 221 of the second coil 220 may be substantially coplanar with each other. The third layer 221 may be provided has a flat helical coil having a single-layer structure.

According to various embodiments, the first shape of the first layer 211 of the first coil 210 may be a ring shape in which one wire is wound in a helical shape, and the second shape of the second layer 212 of the first coil 210 may be a ring shape in which one wire extending from the first layer 211 is wound in a helical shape and may have an area smaller than that of the first layer 211 wound in the ring shape. As another example, the third shape of the third layer 221 of the second coil 220 may be a ring shape in which one wire is wound in a helical shape, and the wire of the third layer 221 may have a diameter equal to or larger than the diameter of the wire of the first layer 211 and/or the diameter of the wire of the second layer 212.

According to various embodiments, at least a portion of the first layer 211 may be disposed to overlap at least a portion of the second layer 212. As another example, at least a portion of the first layer 211 and at least a portion of the third layer 221 may be disposed to overlap each other. For example, at least a portion of the first coil 210 (e.g., the second layer 212) may be disposed in the form of being embedded in an opening formed in the inner diameter of the third layer 221 formed by the second coil 220.

According to an embodiment, the outer diameter D1 of the first layer 211 may be larger than the outer diameter D2 of the second layer 212, and the inner diameter d1 of the first layer 211 may be equal to or larger than the inner diameter d2 of the second layer 212. The central axis O of the first layer 211 and the central axis O of the second layer 212 are arranged on the same line, and the region adjacent to the inner diameter d1 of the first layer 211 may be disposed to overlap the region adjacent to the inner diameter d2 of the second layer 212. As another example, the central axis O of the first layer 211 and the central axis O of the second layer 212 are arranged parallel to each other within a designated distance.

According to an embodiment, the outer diameter D3 of the third layer 221 may be larger than the outer diameter D1 of the first layer 211, and the inner diameter d3 of the third layer 221 may be larger than the outer diameter d2 of the second layer 212. The second layer 212 is disposed in the form of being embedded inside the inner diameter d3 of the third layer 221 and the second layer 212 and the third layer 221 are may be substantially coplanar with each other. The central axis O of the third layer 221 and the central axis O of the first layer 211 and the second layer 212 are arranged on the same line such that the region adjacent to the inner diameter d1 of the first layer 211 is disposed to overlap the region adjacent to the inner diameter d2 of the second layer 212, and the region adjacent to the outer diameter D1 of the first layer 211 may be disposed to overlap the region adjacent to the inner diameter d3 of the third layer 221. As another example, the central axis O of the third layer 221 and the central axis O of the first layer 211 and the second layer 212 may be arranged parallel to each other within a designated distance depending on a design tolerance.

According to various embodiments, the first number of turns of the first layer 211 may be larger than the second number of turns. For example, the first layer 211 may have a structure in which a wire is helically wound at least five times around the central axis O, and the second layer 212 may have a structure in which a wire is helically wound at least two times around the central axis O. As another example, the third layer 221 may have a structure in which a wire is helically wound at least four times around the central axis O. However, the number of turns of the first layer 211, the number of turns of the second layer 212, and/or the number of turns of the third layer 221 is not limited thereto, and it is possible to change the design to various numbers of turns in order to maximize the wireless power transmission efficiency.

According to various embodiments, in the coil unit 200, at least a portion of the third layer 221 may be exposed in the outer direction of the first layer 211 when viewed from above the first layer 211 (in the second direction (−Z)). As another example, at least a portion of the second layer 212 may be exposed to the inner diameter of the first layer 211 when viewed from above the first layer 211 (in the second direction (−Z)). The outer diameter D3 of the third layer 221 may be larger than the outer diameter D1 of the first layer 211. The inner diameter d2 of the second layer 212 may be smaller than the inner diameter d1 of the first layer 211. A wire disposed in a portion of the third layer 221 and a region adjacent to the inner diameter d2 of the second layer 212 may be exposed to the top and rear faces of the first coil 210.

Figure 8:
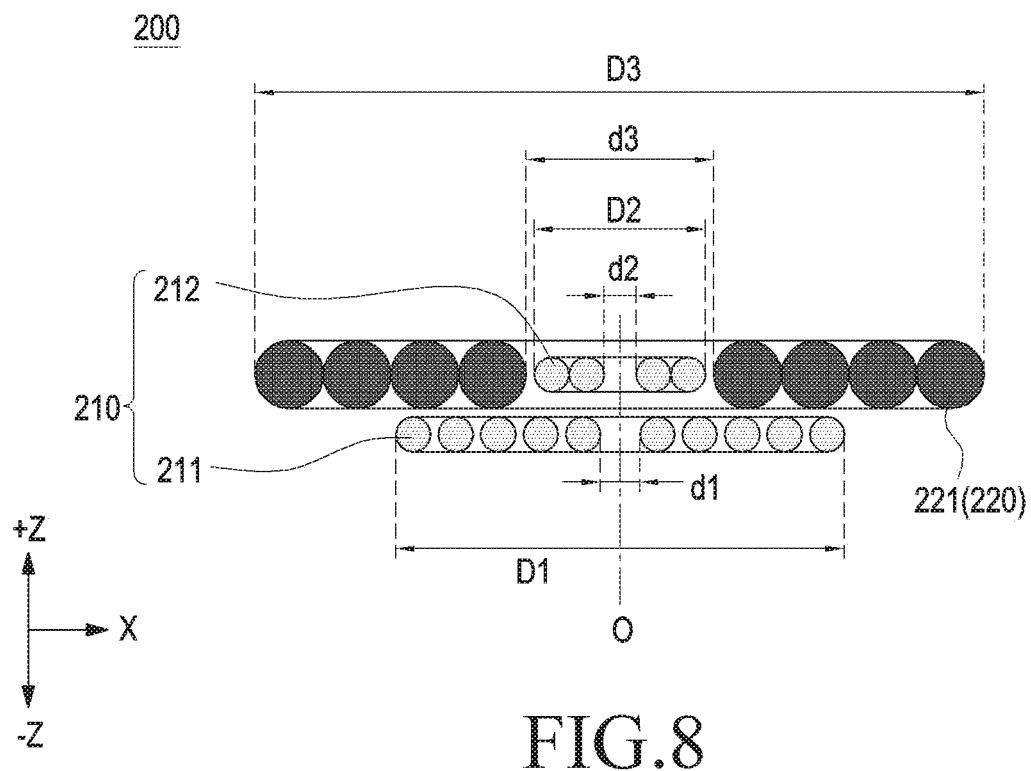
FIG. 8 is a schematic view illustrating cross sections of a first coil and a second coil of a coil unit according to another embodiment of the disclosure.
Figure 9:
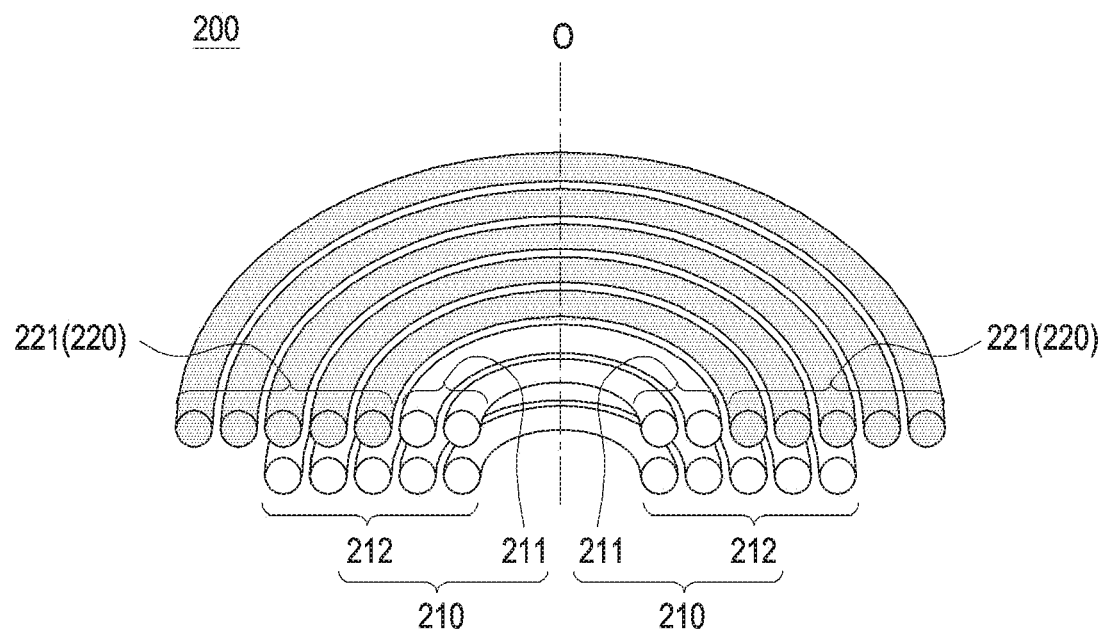
FIG. 9 is a perspective view illustrating cross sections of a first coil and a second coil of a coil unit according to another embodiment of the disclosure.

FIG. 8 is a schematic view illustrating cross sections of a first coil and a second coil of a coil unit according to another embodiment of the disclosure. FIG. 9 is a perspective view illustrating cross sections of a first coil and a second coil of a coil unit according to another embodiment of the disclosure.

Referring to FIGS. 8 and 9, a coil unit 200 within an electronic device may include a first coil 210 by a first number or a second number of turns and a second coil 220 by a third number of turns. The configuration of the first coil 210 in FIGS. 8 and 9 may be at least partially the same as the configuration of the first coil 210 of the coil unit 200 in FIG. 2 and FIGS. 3A and 3B, and the configuration of the first coil 210 in FIGS. 8 and 9 may be at least partially the same as the configuration of the second coil 220 in FIG. 2.

In FIG. 8, "X" in a 2-axis orthogonal coordinate system may indicate the radial direction of the coil unit 200, and "Z" may indicate the thickness direction of the coil unit 200. In an embodiment, "Z" may indicate a first direction (+Z) or a second direction (−Z). FIGS. 8 and 9 are different from FIGS. 5 to 7 in terms of the arrangement relationship of the first coil 210 and the second coil 220. Thus, descriptions will be focused on a different configuration, and a redundant description may be omitted.

According to various embodiments, each of the first coil 210 and the second coil 220 may include one or more layers, and at least some layers of the second coil 220 may be stacked on at least some layers of the first coil 210.

According to various embodiments, the first coil 210 may be disposed such that a plurality of layers 211 and 212 are stacked. For example, the first coil 210 may include a first layer 211 wound in a first shape by a first number of turns and a second layer 212 extending from the first layer 211 and wound in a second shape by a second number of turns. According to an embodiment, one layer of the second coil 220 may be disposed adjacent to the first coil 210. For example, the second coil 220 may include a third layer 221 wound in a third shape by a third number of turns.

According to an embodiment, the second coil 220 may be a coil conforming to a WPC standard. As another example, the first coil 210 and the second coil 220 may be coils conforming to a WPC standard.

According to various embodiments, with reference to the shielding member (e.g., the shielding member 300 in FIG. 2) of the electronic device (e.g., the electronic device 10 in FIG. 2), the first coil 210 may include a first layer 211 and a second layer 212 disposed above the first layer 211 (e.g., in the second direction (+Z)). The first layer 211 and the second layer 212 are connected to each other, and may be provided as a flat helical coil having a multilayer structure. According to an embodiment, the second coil 220 may be disposed on a first face (e.g., the first face 110A in FIG. 2) of the electronic device 10. For example, the second layer 212 is disposed on the first face 110A, and may be substantially coplanar with the third layer 221. The third layer 221 may be provided has a flat helical coil having a single-layer structure. According to an embodiment, the shielding member 300 may be disposed on a portion of the second coil 220. For example, the shielding member 300 may be disposed in a region below the third layer 221 of the second coil 220 along the edge region of the first layer 211 of the first coil 210.

According to various embodiments, at least a portion of the first layer 211 may be disposed to overlap at least a portion of the second layer 212. As another example, at least a portion of the first layer 211 and at least a portion of the third layer 221 may be disposed to overlap each other. For example, at least a portion of the first coil 210 (e.g., the second layer 212) may be disposed in the form of being embedded in an opening formed in the inner diameter of the third layer 221 formed by the second coil 220.

According to various embodiments, in the coil unit 200, the second layer 212 and the third layer 221, which are coplanar with each other, may cover the entire area of the first layer 211 disposed therebelow (in the second direction (−Z)) when viewed from above the second layer 212 (in the second direction (−Z)). For example, since the second layer 212 is embedded inside the inner diameter d3 of the third layer 221, the outer diameter D3 of the third layer 221 is larger than the outer diameter D1 of the first layer 211, and the inner diameter d2 of the second layer 212 is smaller than the inner diameter d1 of the first layer 211. The first layer 211 may not be exposed on the front face.

Figure 10:
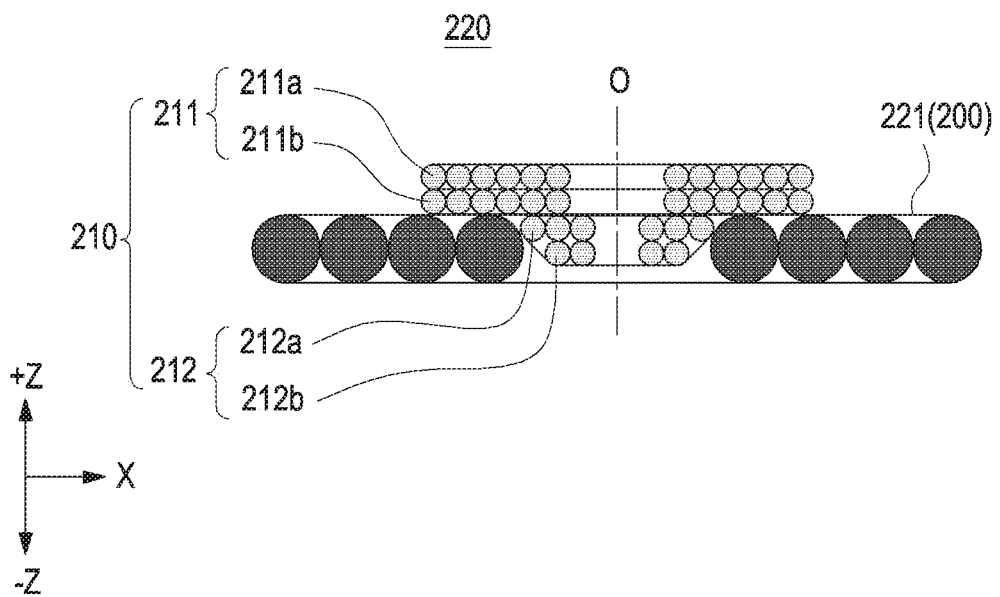
FIG. 10 is a schematic view illustrating cross sections of a first coil and a second coil of a coil unit according to another embodiment of the disclosure.

FIG. 10 is a schematic view illustrating cross sections of a first coil and a second coil of a coil unit according to another embodiment of the disclosure.

Referring to FIG. 10, a coil unit 200 within an electronic device may include a first coil 210 wound by a designated first number or second number of turns and a second coil 220 wound by a designated third number of turns. The configuration of the first coil 210 in FIG. 10 may be at least partially the same as the configurations of the first coil 210 and the second coil 220 of the coil unit 200 in FIGS. 6 and 7.

In FIG. 10, "X" in a 2-axis orthogonal coordinate system may indicate the radial direction of the coil unit 200, and "Z" may indicate the thickness direction of the coil unit 200. In an embodiment, "Z" may indicate a first direction (+Z) or a second direction (−Z). FIG. 10 is partially different from FIGS. 6 to 7 in terms of the configuration of the first coil 210. Thus, descriptions will be focused on a different configuration, and a redundant description may be omitted.

According to various embodiments, each of the first coil 210 and the second coil 220 may include one or more layers, and at least some layers of the second coil 220 may be stacked on at least some layers of the first coil 210.

According to various embodiments, the first coil 210 may be disposed such that a plurality of layers 211 and 212 are stacked. For example, the first coil 210 may include a first layer 211 wound in a first shape by a first number of turns and a second layer 212 extending from the first layer 211 and wound in a second shape by a second number of turns. According to an embodiment, one layer of the second coil 220 may be disposed adjacent to the first coil 210. For example, the second coil 220 may include a third layer 221 wound in a third shape by a third number of turns.

According to an embodiment, the second coil 220 may be a coil conforming to a WPC standard. As another example, the first coil 210 and the second coil 220 may be coils conforming to a WPC standard.

According to various embodiments, with reference to the first face (e.g., the first face 110A in FIG. 2) of the electronic device (e.g., the electronic device 10 in FIG. 2), the first coil 210 may include a first layer 211 and a second layer 212 disposed below the first layer 211 (e.g., in the second direction (−Z)). The first layer 211 and the second layer 212 are connected to each other, and may be provided as a flat helical coil having a multilayer structure.

According to an embodiment, the first layer 211 may include a plurality of layers. For example, the first layer 211 may include a (1-1)th layer 211a and a (1-2)th layer 211b disposed below the (1-1)th layer 211a. The (1-1)th layer 211a and the (1-2)th layer 211b may be provided in a ring shape in which one wire is wound in a helical shape and may have a structure of stacked layers connected to each other. According to an embodiment, the number of turns of the (1-1)th layer 211a may be the same as the number of turns of the (1-2)th layer 211b. For example, the (1-1)th layer 211a and the (1-2)th layer 211b may be helically wound at least five times around the central axis O.

According to an embodiment, the second layer 212 may include a plurality of layers. For example, the second layer 212 may include a (2-1)th layer 212a and a (2-2)th layer 212b disposed below the (2-1)th layer 212a. The (2-1)th layer 212a and the (2-2)th layer 212b may be provided in a ring shape in which one wire is wound in a helical shape and may have a structure of stacked layers connected to each other. According to an embodiment, the number of turns of the (2-1)th layer 212a may be larger than or the same as the number of turns of the (2-2)th layer 212b. For example, when the number of turns of the (2-1)th layer 212a is larger than the number of turns of the (2-2)th layer 212b, the (2-1)th layer 212a may have a structure in which a wire is helically wound at least three times around the central axis O. The (2-2)th layer 212b may have a structure in which a wire is helically wound at least two times around the central axis O. Since the (2-1)th layer 212a and the (2-2)th layer 212b are embedded in openings formed in the inner diameter of the third layer 221 formed by the second coil 220, the number of turns to be wound may be reduced downward. However, the number of turns of the first layer 211 and the number of turns of the second layer 212 are not limited thereto, and it is possible to change the design to various numbers of turns in order to maximize the wireless power transmission efficiency.

Figure 11:
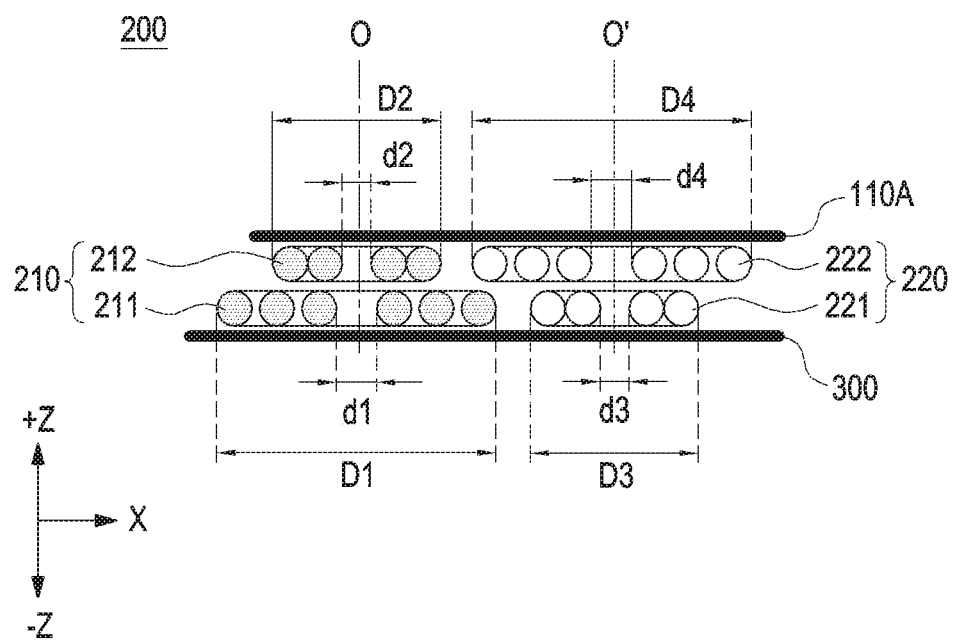
FIG. 11 is a cross-sectional view illustrating a structure of a coil unit according to another embodiment of the disclosure.

FIG. 11 is a cross-sectional view illustrating a structure of a coil unit according to another embodiment of the disclosure.

Referring to FIG. 11, a coil unit 200 within an electronic device may include a first coil module (e.g., the first coil 210) wound by a designated first number of turns or a designated second number of turns and a second coil module (e.g., the second coil 220) wound by a designated third number of turns or a designated fourth number of turns. The configuration of the first coil 210 in FIG. 11 may be at least partially the same as the configuration of the first coil 210 of the coil unit 200 in FIG. 2 and FIGS. 3A and 3B, and the configuration of the second coil 220 in FIGS. 5 to 7 may be at least partially the same as the configuration of the second coil 220 in FIG. 2 and FIGS. 5 to 7.

In FIG. 11, "X" in a 2-axis orthogonal coordinate system may indicate the radial direction of the coil unit 200, and "Y" may indicate the thickness direction of the coil unit 200. In an embodiment, "Z" may indicate a first direction (+Z) or a second direction (−Z).

According to various embodiments, an electronic device (e.g., the electronic device 10 in FIG. 2) may include therein a coil unit 200 as a wireless power transmission device that transmits power wirelessly. A wireless power reception device (e.g., the wireless power reception device 21 or 22 in FIG. 1) that receives wireless power from the electronic device 10 may include a reception coil unit for receiving power. The coil unit 200 of the electronic device 10 may include a Tx coil, and the reception coil unit of the wireless power reception device 21 or 22 may include an Rx coil. By disposing the Rx coils of the wireless power reception device 21 or 22 to face each other in the region in which at least one Tx coil of the electronic device 10 is disposed, it is possible to transmit power through an inductive coupling scheme based on a magnetic induction phenomenon by the wireless power signal or a resonance coupling scheme based on an electromagnetic resonance phenomenon by a wireless power signal of a specific frequency.

According to various embodiments, the first coil 210 and/or the second coil 220 may be disposed between the first face 110A of the housing (e.g., the housing 100 in FIG. 2), which forms the outer face of the electronic device 10, and the shielding member 300 within the housing 100. When the first coil 210 and the second coil 220 are disposed to face each other, the first coil 210 and the second coil 220 may have the same thickness in the Z-axis direction so that no step is formed. Accordingly, the first coil 210 and the second coil 220 may be disposed to be in close contact with the Rx coils of the wireless power reception device 21 or 22 (in a coil thickness or less), thereby improving the efficiency (e.g., the improvement of charging efficiency or the reduction of heat generation).

According to various embodiments, each of the first coil 210 and the second coil 220 may include a plurality of layers, and at least some layers of the second coil 220 may be disposed to be stacked on at least some layers of the first coil 210.

According to various embodiments, the first coil 210 may be disposed such that a plurality of layers 211 and 212 are stacked. For example, the first coil 210 may include a first layer 211 wound in a designated first shape by a first number of turns and a second layer 212 extending from the first layer 211 and wound in a designated second shape by a second number of turns. According to an embodiment, the second coil 220 may be disposed such that a plurality of layers 221 and 222 are stacked. For example, the second coil 220 may include a third layer 221 wound in a designated third shape by a third number of turns and a fourth layer 222 extending from the third layer 221 and wound in a designated fourth shape by a fourth number of turns.

According to various embodiments, with reference to the first face 110A of the housing 100 of the electronic device 10, the first coil 210 may include a second layer 212 and a first layer 211 disposed below the second layer 212. The first layer 211 and the second layer 212 are connected to each other, and may be provided as a flat helical coil having a multilayer structure. With reference to the first face 110A of the housing 100 of the electronic device 10, the second coil 220 may include a fourth layer 222 and a third layer 221 disposed below the fourth layer 222. The third layer 221 and the fourth layer 222 are connected to each other, and may be provided as a flat helical coil having a multilayer structure.

According to various embodiments, the first shape of the first layer 211 of the first coil 210 may be a ring shape in which one wire is wound in a helical shape, and the second shape of the second layer 212 of the first coil 210 may be a ring shape in which a wire extending from the first layer 211 is wound in a helical shape and may have an area smaller than that of the first layer 211. According to an embodiment, the third shape of the third layer 221 of the second coil 220 may be a ring shape in which one wire is wound in a helical shape, and the fourth shape of the fourth layer 222 may be a ring shape in which a wire extending from the third layer 221 is wound in a helical shape and may have an area wider than that of the third layer 221. The diameters of the wires of the first to fourth layers 211 to 222 may be the same as each other.

According to various embodiments, a plurality of layers of the first coil 210 may be disposed to be at least partially overlap each other, and a plurality of layers of the second coil 220 may be disposed to at least partially overlap each other. As another example, at least some layers of the first coil 210 and at least some layers of the second coil 220 may be disposed to overlap each other.

According to an embodiment, at least a portion of the first layer 211 may be disposed to overlap at least a portion of the second layer 212. As another example, at least a portion of the first layer 211 and at least a portion of the fourth layer 222 may be disposed to overlap each other. According to an embodiment, the second coil 220 corresponds to the first coil 210 in shape, and may be provided in a 180-degree-reversed configuration so as to be fitted to each other. For example, the second layer 212 and the fourth layer 222 may be substantially coplanar with each other, and the first layer 211 and the third layer 221 may be substantially coplanar with each other. A stepped shape generated according to the sizes of the diameters of the first layer 211 and the second layer 212 is disposed to be engaged with a stepped shape generated according to the sizes of the diameters of the third layer 221 and the fourth layer 222. Thus, even if a plurality of coils are arranged, it is possible to limit the mounting space expansion (e.g., a height increase) between the first surface (e.g., first face 110A) and the shielding member 300 in the housing 100.

According to an embodiment, at least a portion of the fourth layer 222 may be disposed to overlap at least a portion of the third layer 221. As another example, another portion of the fourth layer 222 and at least a portion of the first layer 211 may be disposed to overlap each other.

According to an embodiment, the outer diameter D1 of the first layer 211 may be larger than the outer diameter D2 of the second layer 212, and the inner diameter d1 of the first layer 211 may be equal to or larger than the inner diameter d2 of the second layer 212. The central axis O of the first layer 211 and the central axis O of the second layer 212 are arranged on the same line, and the region adjacent to the inner diameter d1 of the first layer 211 may be disposed to overlap the region adjacent to the inner diameter d2 of the second layer 212. As another example, the central axis O of the first layer 211 and the central axis O of the second layer 212 are arranged parallel to each other within a designated distance depending on a design tolerance.

According to an embodiment, the outer diameter D4 of the fourth layer 222 may be equal to or larger than the outer diameter D3 of the third layer 221, and the inner diameter d4 of the fourth layer 222 may be equal to or larger than the inner diameter d3 of the third layer 221. The central axis O' of the fourth layer 222 and the central axis O' of the third layer 221 are arranged on the same line or within a predetermined distance, and the region adjacent to the inner diameter d4 of the fourth layer 222 may be disposed to overlap the region adjacent to the inner diameter d3 of the third layer 221. The central axis O of the first layer 211 and the second layer 212 and the center axis O' of the third layer 221 and the fourth layer 222 may be arranged parallel to each other.

According to various embodiments, the first shape according to the first number of turns of the first layer 211 may correspond to the fourth shape according to the fourth number of turns of the fourth layer 222. For example, the first shape of the first layer 211 and the fourth shape of the fourth layer 222 may be the same as each other. As another example, the second shape according to the second number of turns of the second layer 212 may correspond to the third shape according to the third number of turns of the third layer 221. For example, the second shape of the second layer 212 and the third shape of the third layer 221 may be the same as each other.

According to an embodiment, the first number of turns of the first layer 211 may be larger than the second number of turns of the second layer 212. For example, the first layer 211 may have a structure in which a wire is helically wound at least three times around the central axis O, and the second layer 212 may have a structure in which a wire is helically wound at least two times around the central axis O. As another embodiment, the fourth number of turns of the fourth layer 222 may be larger than the third number of turns of the third layer 221. For example, the fourth layer 222 may have a structure in which a wire is helically wound at least three times around the central axis, and the third layer 221 may have a structure in which a wire is helically wound at least two times around the central axis O. However, the number of turns of the first layer 211, the number of turns of the second layer, the number of turns of the third layer 221, and/or the number of turns of the fourth layer 222 is not limited thereto, and it is possible to change the design to various numbers of turns capable of maximizing the wireless power transmission efficiency and minimizing heat generation.

According to various embodiments, in the first coil 210, at least a portion of the first layer 211 may be exposed to the outside of the second layer 212 when viewed from above the second layer 212 (in the second direction (−Z)). Since the outer diameter D2 of the second layer 212 is larger than the outer diameter D1 of the first layer 211, the wire deposed in the region adjacent to the outer diameter D2 of the second layer 212 may be exposed to the top face and the rear face of the first coil 210. According to an embodiment, in the second coil 220, at least a portion of the third layer 221 may be exposed to the inner diameter d4 of the fourth layer 222 when viewed from above the fourth layer 222 (in the second direction (−Z)). Since the inner diameter d4 of the fourth layer 222 is larger than the inner diameter d3 of the third layer 221, the wire deposed in the region adjacent to the inner diameter d3 of the third layer 221 may be exposed to the top face and the rear face of the second coil 220.

According to various embodiments, it is possible to improve wireless power transmission efficiency through a transmission coil having a multi-layer structure according to the first coil 210 and the second coil 220.

Figure 12:
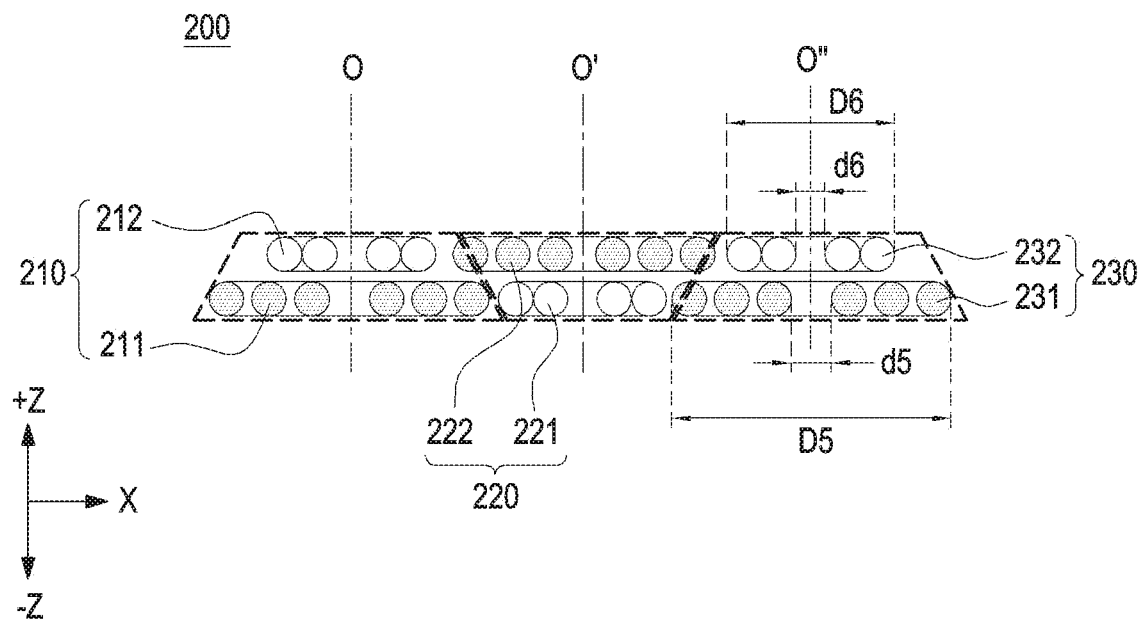
FIG. 12 is a cross-sectional view illustrating the structure of a coil unit according to another embodiment of the disclosure.
Figure 13:
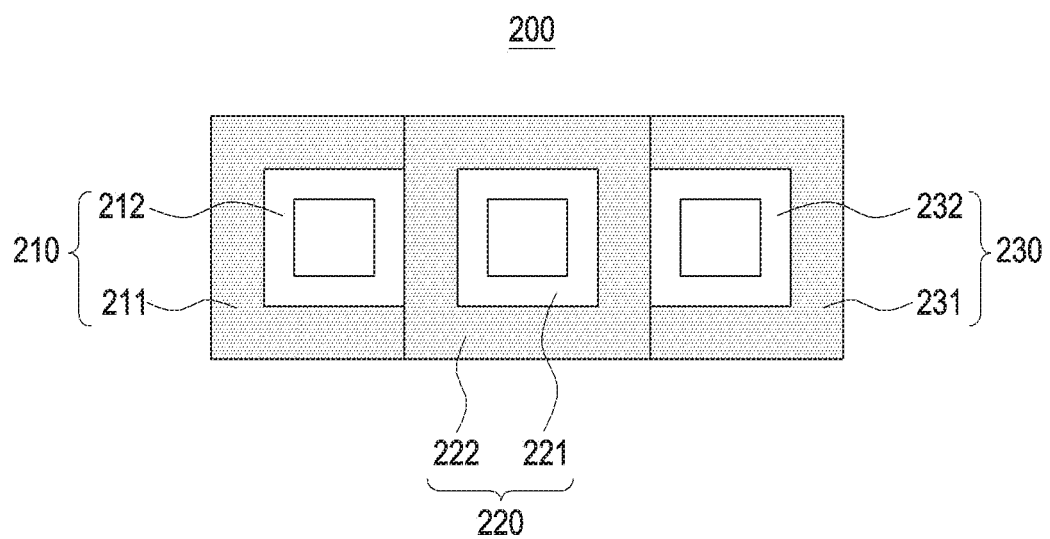
FIG. 13 is a schematic view illustrating a structure of a coil unit of FIG. 11, which is viewed from above according to an embodiment of the disclosure.

FIG. 12 is a cross-sectional view illustrating the structure of a coil unit according to another embodiment of the disclosure. FIG. 13 is a schematic view illustrating the structure of the coil unit of FIG. 12, which is viewed from above according to another embodiment of the disclosure.

Referring to FIGS. 12 and 13, a coil unit 200 within an electronic device may include a first coil module (e.g., the first coil 210) specified by a first number of turns or a second number of turns, a second coil module (e.g., the second coil 220) specified by third number of turns or a fourth number of turns, and a third coil module (e.g., the third coil 230) specified by a fifth number of turns or a sixth number of turns. The configurations of the first coil 210 and the second coil 220 of the coil unit 200 in FIGS. 11 and 12 may be at least partially the same as the configurations of the first coil 210 and the second coil 220 of the coil unit 200 in FIG. 10.

In FIGS. 12 and 13, "X" in a 2-axis orthogonal coordinate system may indicate the radial direction of the coil unit 200, and "Z" may indicate the thickness direction of the coil unit 200. In an embodiment, "Z" may indicate a first direction (+Z) or a second direction (−Z).

According to various embodiments, the first coil 210, the second coil 220, and the third coil 230 may be disposed between the first face (e.g., the first face 110A in FIG. 2) of the housing, which forms the outer face of the electronic device (e.g., the electronic device 10 in FIG. 2), and the shielding member (e.g., the shielding member 300 in FIG. 2) within the housing 100. When the coil units 200 composed of the first coil 210, the second coil 220, and the third coil 230 are disposed to face each other, the first coil 210, the second coil 220 and the third coil 230 may have the same thickness in the Z-axis direction so that no step is formed. Accordingly, the coil units 200 may be disposed to be in close contact with the coils of the wireless power reception device (e.g., the wireless power reception device 21 or 22 in FIG. 2) (in a coil thickness or less), thereby improving the efficiency.

According to various embodiments, each of the first coil 210, the second coil 220, and the third coil 230 may include a plurality of layers, and at least some layers of the second coil 220 may be disposed to be stacked on at least some layers of the first coil 210. As another example, at least some layers of the second coil 220 and at least some layers of the third coil 230 may be disposed to overlap each other. According to various embodiments, the structures of the first coil 210 and the second coil 220 may be similar to those of the first coil 210 and the second coil 220 of FIG. 10, and the third coil 230 may be disposed on one side of the second coil 220 in a configuration corresponding to the first coil 210 with reference to the second coil 220. Hereinafter, the structure of the third coil 230 (e.g., the arrangement relationship with the second coil 220), which appears as a difference, will be described.

According to various embodiments, the third coil 230 may have a plurality of layers 211 and 212, which may be disposed to be stacked. For example, the third coil 230 may include a fifth layer 231 wound in a fifth shape specified by a fifth number of turns and a sixth layer 232 extending from the fifth layer 231 and wound in a sixth shape specified by a sixth number of turns. According to an embodiment, the third coil 230 may be provided to correspond to the structure of the first coil 210.

According to various embodiments, with reference to the first face 110A of the housing 100 of the electronic device 10, the third coil 230 may include a sixth layer 232 and a fifth layer 231 disposed below the sixth layer 232 in the second direction (−Z). The fifth layer 231 and the sixth layer 232 are connected to each other, and may be provided as a flat helical coil having a multilayer structure.

According to various embodiments, the fifth shape of the fifth layer 231 of the third coil 230 may be a ring shape in which one wire is wound in a helical shape, and the sixth shape of the sixth layer 232 of the third coil 230 may be a ring shape in which a wire extending from the fifth layer 231 is wound in a helical shape and may have an area smaller than that of the fifth layer 231. The diameters of the wires of the fifth layer 231 and the sixth layer 232 may be the same of the diameters of the wires of the first to fourth layers 211, 212, 221, and 222 may be the same as each other.

According to various embodiments, a plurality of layers of the third coil 230 may be disposed to be at least partially overlap each other, and a plurality of layers of the second coil 220 may be disposed to at least partially overlap each other. As another example, at least some layers of the third coil 230 and at least some layers of the second coil 220 may be disposed to overlap each other.

According to an embodiment, at least a portion of the fifth layer 231 may be disposed to overlap at least a portion of the sixth layer 232. As another example, at least a portion of the fifth layer 231 and at least a portion of the fourth layer 222 may be disposed to overlap each other. According to an embodiment, the third coil 230 corresponds to the second coil 220 in shape, and may be provided in a 180-degree-reversed configuration so as to be fitted to each other. For example, the third layer 221 and the fifth layer 231 may be substantially coplanar with each other, and the fourth layer 222 and the sixth layer 232 may be substantially coplanar with each other. A stepped shape generated according to the sizes of the diameters of the third layer 221 and the fourth layer 222 is disposed to be engaged with a stepped shape generated according to the sizes of the diameters of the fifth layer 231 and the sixth layer 232. Thus, even if a plurality of coils are arranged, it is possible to limit the mounting space expansion (e.g., a height increase) between the first surface (e.g., first face 110A) and the shielding member 300 in the housing 100.

According to an embodiment, the outer diameter D5 of the fifth layer 231 may be larger than the outer diameter D6 of the sixth layer 232, and the inner diameter d5 of the fifth layer 231 may be larger than the inner diameter d6 of the sixth layer 232. The central axis O" of the fifth layer 231 and the central axis O" of the sixth layer 232 are arranged on the same line, and the region adjacent to the inner diameter d5 of the fifth layer 231 may be disposed to overlap the region adjacent to the inner diameter d6 of the sixth layer 232. As another example, the central axis O" of the fifth layer 231 and the central axis O" of the sixth layer 232 are arranged parallel to each other within a specified distance depending on a design tolerance. According to an embodiment, the first layer 211 and the second layer 212 may be disposed on the same line or may be disposed parallel to each other within a predetermined distance with reference to the central axis O, and the third layer 221 and the fourth layer 222 may be disposed on the same line or may be disposed parallel to each other within a predetermined distance with reference to the central axis O'.

According to various embodiments, the fifth shape according to the fifth number of turns of the fifth layer 231 may correspond to the first shape according to the first number of turns of the first layer 211 and the fourth shape according to the fourth number of turns of the fourth layer 222. For example, the fifth shape of the fifth layer 231, the first shape of the first layer 211, and the fourth shape of the fourth layer 222 may be the same as each other. As another example, the sixth shape according to the sixth number of turns of the sixth layer 232 may correspond to the second shape according to the second number of turns of the second layer 212 and the third shape according to the third number of turns of the third layer 221. For example, the fifth shape of the fifth layer 231, the first shape of the first layer 211, and the third shape of the third layer 221 may be the same as each other.

According to an embodiment, the fifth number of turns of the fifth layer 231 may be larger than the sixth number of turns of the sixth layer 232. For example, the fifth layer 231 may have a structure in which a wire is helically wound at least three times around the central axis O", and the sixth layer 232 may have a structure in which a wire is helically wound at least two times around the central axis O". However, the number of turns of the fifth layer 231 and/or the number of turns of the sixth layer 232 is not limited thereto, and it is possible to change the design to various numbers of turns capable of maximizing the wireless power transmission efficiency and minimizing heat generation.

According to various embodiments, in the third coil 230, at least a portion of the fifth layer 231 may be exposed to the outside of the sixth layer 232 when viewed from above the sixth layer 232 (in the second direction (−Z)). The outer diameter D5 of the fifth layer 231 may be equal to or larger than the outer diameter D6 of the sixth layer 232. When the outer diameter D5 of the fifth layer 231 is larger than the outer diameter D6 of the sixth layer 232, the wire of the fifth layer 231 deposed in the region adjacent to the outer diameter D6 of the sixth layer 232 may be exposed to the top face and the rear face of the third coil 230.

According to various embodiments, it is possible to improve wireless power transmission efficiency through a transmission coil having a multi-layer structure according to the first coil 210, the second coil 220, and the third coil 230.

FIG. 14 is a block diagram of a wireless charging system according to various embodiments of the disclosure.

Referring to FIG. 14, a wireless charging system according to an embodiment may include an electronic device 10 configured to transmit wireless power and an external wireless power reception device 21 or 22 (e.g., the wireless power reception device of FIG. 1). The electronic device 10 may include all or part of the electronic device 10 illustrated in FIGS. 1 and 2.

The electronic device 10 according to an embodiment may include a circuit board (e.g., the circuit board 400 in FIG. 2) that includes various circuits. The circuit board may include a power transmission circuit 411, a control circuit 412, a communication circuit 413, a sensing circuit 415, and a storage circuit 416. The wireless power reception device 21 or 22 may include a power reception circuit 451, a control circuit 452, a communication circuit 453, a sensing circuit 454, and a display unit 455.

The power transmission circuit 411 may provide power required from the wireless power reception device 21 or 22 to receive power and may include a loop coil 411L formed of a conductive pattern. The power transmission circuit 411 may be provided to wirelessly transmit power to the wireless power reception device 21 or 22 through the loop coil 411L. Here, the power transmission circuit 411 may receive power in the form of a DC or AC waveform from the outside, and may supply the received power to the wireless power reception device 21 or 22 in the form of an AC waveform. For example, when power is supplied from the outside in the form of a DC waveform, the power transmission circuit 411 converts the power in the DC waveform into an AC waveform using an inverter to supply the power to the wireless power reception device 21 or 22 in the form of an AC waveform. The power transmission circuit 411 is not limited thereto, and may include any means capable of providing power in the form of a constant AC waveform.

In addition, the power transmission circuit 411 may provide the AC waveform to the wireless power reception device 21 or 22 in the form of an electromagnetic wave. The power transmission circuit 411 may include a loop coil 411L formed of a conductive pattern, and may transmit or receive a predetermined electromagnetic wave generated by applying current to the loop coil 411L using an electromagnetic induction scheme or a resonance scheme. The power transmission circuit 411 may additionally include a first communication circuit 413*a* (e.g., a resonant circuit) and may perform communication (e.g., data communication) in an in-band format using an electromagnetic wave generated by the loop coil 411L. The first communication circuit 413*a* will be described in more detail in the communication circuit 413, which will be described later. When the power transmission circuit 411 is implemented as a resonant circuit, the inductance L of the loop coil 411L of the resonant circuit may be changeable.

In addition, the power transmission circuit 411 may be implemented in the form of an embedded battery, or may be implemented in the form of a power reception interface so as to receive power from the outside and supply the power to other components.

The power transmission circuit 411 may further include, for example, a power adaptor 411*a*, a power generation circuit 411*b*, and a matching circuit 411*c* in addition to the loop coil 411L.

The power adaptor 411*a* may receive AC or DC power input from the outside or may receive a power signal of a battery device and output the power signal as DC power having a predetermined voltage value. The voltage value of the DC power output from the power adaptor 411*a* may be controlled by the control circuit 412. The DC power output from the power adaptor 411*a* may be output to the power generation circuit 411*b*.

The power generation circuit 411*b* may convert the DC current output from the power adaptor 411*a* into AC current, and may output the AC current. The power generation circuit 411*b* may include a predetermined amplifier (not illustrated). When the DC current input through the power adaptor 411*a* is smaller than a predetermined gain, the power generation circuit portion 411*b* may amplify the DC current to a preset gain using the amplifier. In addition, the power generation circuit 411*b* may further include a circuit for converting the DC current input from the power adaptor 411*a* into AC current on the basis of a control signal input from the control circuit 412. For example, the power generation circuit 411*b* may convert the DC current into AC current through a predetermined inverter. Alternatively, the power generation circuit 411*b* may further include a gate drive device (not illustrated), and the gate drive device may change the DC current to AC current while controlling the DC current by turning on/off the DC current. Alternatively, the power generation circuit 411*b* may generate an AC power signal through a wireless power generator (e.g., an oscillator). Accordingly, the power generation circuit 411*b* may output AC power.

The matching circuit 411*c* may perform impedance matching. For example, when an AC signal output from the power generation circuit 411*b* is transmitted to the loop coil 411L, an electromagnetic field may be formed in the loop coil 411L by the AC signal. In this case, the matching circuit 411*c* may regulate the frequency band of the formed electromagnetic field signal to regulate the impedance viewed from the matching circuit 411*c*. Through this regulation, the matching circuit 411*c* may regulate, for example, the impedance viewed from the matching circuit 411*c* transmitted to the wireless power reception device 21 or 22 through the loop coil 411L to perform control such that the output power becomes a highly efficient or high output. The matching circuit 411*c* may regulate the impedance on the basis of the control of the control circuit 412. The matching circuit 411*c* may include at least one of an inductor (e.g., a coil), a capacitor, and a switch device. The control circuit 412 may control the connection state of at least one of the inductor and the capacitor through the switch device, thereby performing impedance matching.

A person ordinarily skilled in the art will readily understand that the power transmission circuit 411 is not limited thereto and may include any means capable of transmitting and receiving electromagnetic waves.

The sensing circuit 415 (e.g., the sensor module 1576) may sense a change in the current/voltage applied to the loop coil 411L of the power transmission circuit 411. The electronic device 10 may generate the amount of transmission power to be transmitted to the wireless power reception device 21 or 22 in response to the magnitude of the current/voltage applied to the loop coil 411L. That is, the electronic device 10 may change the amount of power to be transmitted depending on the change of the current/voltage applied to the loop coil 411L. For example, as the magnitude of the current/voltage applied to the loop coil 411L increases, the amount of power to be transmitted may increase, and as the magnitude of the current/voltage applied to the loop coil 411L decreases, the amount of power to be transmitted may decrease. In addition, the sensing circuit 415 may sense the temperature change of the electronic device 10. The sensing circuit 415 may generate power to be transmitted through the power transmission circuit 411, or may sense a temperature change caused by heat, which may be generated from the electronic device 10 during the transmission of the generated power to the wireless power reception device 21 or 22. For example, the sensing circuit 415 may measure at least one of the internal temperature and the external temperature of the electronic device 10. According to an embodiment, the sensing circuit 415 may include at least one of a current/voltage sensor and a temperature sensor.

The control circuit 412 may control the overall operation of the electronic device 10. The control circuit 412 may control the entire operation of the electronic device 10 using an algorithm, a program, or an application required for control and stored in the storage circuit 416. In addition, the control circuit 412 may perform control to transmit power wirelessly to the wireless power reception device 21 or 22 through the power transmission circuit 411. The control circuit 412 may perform control to receive information wirelessly from the wireless power reception device 21 or 22 through the communication circuit 413.

The communication circuits (the first communication circuit 413a and the second communication circuit 413b) (e.g., the interface 1577 and the communication module 1590) may communicate with the wireless power reception device 21 or 22 in a predetermined manner. The communication circuit 413 may perform data communication with the communication circuit 453 (the first communication circuit 453a and the second communication circuit 453b) of the wireless power reception device 21 or 22.

Meanwhile, the communication circuit 413 may transmit a signal for information of the electronic device 10 to the wireless power reception device 21 or 22. Here, the communication circuit 413 may unicast, multicast, or broadcast the signal. In addition, the communication circuit 413 may transmit a charging function control signal for controlling the charging function of the wireless power reception device 21 or 22. The charging function control signal is a control signal that controls the power reception circuit 451 of a specific electronic device (e.g., the wireless power reception device 21 or 22) to enable or disable the charging function.

Meanwhile, the communication circuit 413 may receive/transmit a signal from/to other wireless power transmission devices (not illustrated) as well as the wireless power reception device 21 or 22.

The communication circuit 413 according to an embodiment may include at least one of, for example, a first communication circuit 413a implemented as one piece of hardware with the power transmission circuit 411 such that the electronic device 10 performs communication in an in-band format, and a second communication circuit 413b implemented in hardware different from the power transmission circuit 411 such that the electronic device 10 performs communication in an out-of-band format.

For example, when the communication circuit 413 includes the first communication circuit 413a capable of performing communication in the in-band format, the first communication circuit 413a is capable of receiving the frequency and the signal level of an electromagnetic field signal received through the loop coil 411L of the power transmission circuit 411. In this case, the control circuit 412 may extract the information received from the wireless power reception device 21 or 22 by decoding the frequency and the signal level of the received electromagnetic field signal. In addition, the first communication circuit 413a applies a signal for the information of the electronic device 10, which is to be transmitted to the wireless power reception device 21 or 22, to the loop coil 411L of the power transmission circuit 411, or may transmit an electromagnetic signal, which is generated by applying a signal output from the matching circuit 411c to the loop coil 411L, after adding the signal for the information of the electronic device 10 to the electromagnetic signal. In this case, the control circuit 412 may perform control such that the signal is output after changing the connection state of the matching circuit 411c to at least one of the inductor and the capacitor of the matching circuit 411c through the on/off control of the switching device included in the matching circuit 411c.

For example, when the communication circuit 413 includes the second communication circuit 413b capable of performing communication in the out-of-band manner, the second communication circuit 413b may communicate with the communication circuit 453 (e.g., the second communication circuit 453b) of the wireless communication device (e.g., wireless power reception device 21 or 22) using near field communication (NFC), Zigbee communication, infrared communication, visible light communication, Bluetooth communication, bluetooth low energy (BLE) communication, and the like.

Meanwhile, the above-mentioned communication schemes of the communication circuit 413 are merely examples, and the embodiments are not limited to a specific communication scheme performed by the communication circuit 413.

In addition, the communication circuit 413 may transmit a charging function control signal for controlling the charging function of the wireless power reception device 21 or 22. The charging function control signal may be a control signal that controls the power reception circuit 451 of the wireless power reception device 21 or 22 to enable or disable the charging function.

The communication circuit 413 may receive a signal from other wireless power transmission devices (not illustrated) as well as the wireless power reception device 21 or 22. FIG. 7 illustrates that the communication circuit 413 is configured as hardware different from the power transmission circuit 411 such that the electronic device 10 performs communication in the out-of-band format, but this is merely an example. In the disclosure, the power transmission circuit 411 and the communication circuit 413 may be implemented as one piece of hardware, and thus the electronic device 10 may perform communication in an in-band format.

The electronic device 10 and the wireless power reception device 21 or 22 may transmit and receive various signals through the respective communication circuits 413 and 453 thereof.

In addition, according to various embodiments, the electronic device 10 may be a portable terminal including the power transmission circuit 411 and a battery. Accordingly, the electronic device 10, which is a portable terminal, may transmit the power stored in the battery to the wireless power reception device 21 or 22 as wireless power. In addition, according to various embodiments, the electronic device 10 is not limited to a wireless charger or a portable terminal, and may be various electronic devices including the power transmission circuit 411.

Meanwhile, the power reception circuit 451 of the wireless power reception device 21 or 22 according to an embodiment may receive power from the power transmission circuit 411 of the electronic device 10. The power reception circuit 451 may be implemented in the form of an embedded battery, or may be implemented in the form of a power reception interface so as to receive power from the outside. The power reception circuit 451 may include a loop coil 451L made of a conductive pattern. The power reception circuit 451 may receive, through the loop coil 451L, the wireless power in the form of electromagnetic waves generated in response to the current/voltage applied to the loop coil 411L of the power transmission circuit 411. For example, the power reception circuit 451 may receive the power that is supplied from the power transmission circuit 411 to the loop coil 451L of the adjacent power reception circuit 451 as the power in the form of an AC waveform, which is applied to the loop coil 411L of the power transmission circuit 411, generates an induced electromotive force. For example, the power reception circuit 451 may receive, through the loop coil 451L, the wireless power in the form of electromagnetic waves generated in response to the current/voltage applied to the loop coil 411L of the power transmission circuit 411.

The power reception circuit 451 may further include, for example, a matching circuit 451a, a rectifying circuit 451b, a regulation circuit (regulator) 451c, a switch circuit 451d, and a battery 451e, in addition to the loop coil 451L.

The matching circuit 451a may perform impedance matching. For example, the electric power transmitted through the loop coil 411L of the electronic device 10 may be transmitted to the loop coil 451L to form an electromagnetic field. In this case, the matching circuit 451a may regulate the frequency band of the formed electromagnetic field signal to regulate the impedance viewed from the matching circuit 451a. Through this regulation, the matching circuit 451a may perform control such that the input power received from the electronic device 10 through the loop coil 451L becomes a highly efficient and high output. The matching circuit 451a may regulate the impedance on the basis of the control of the control circuit 452. The matching circuit 451a may include at least one of an inductor (e.g., a coil), a capacitor, and a switch device. The control circuit 452 may control the connection state to at least one of the inductor and the capacitor through the switch device, thereby performing impedance matching.

The rectifying circuit 451b may rectify the wireless power received by the loop coil 451L in a DC form and may be implemented, for example, in the form of a bridge diode.

The regulation circuit 451c may convert the rectified power to a preset gain. The regulation circuit 451c may include a predetermined DC/DC converter (not illustrated). For example, the regulation circuit 451c may convert the rectified power such that the voltage at the output terminal becomes 5V. Meanwhile, the minimum value and the maximum value of the applicable voltage may be preset at the previous stage of the regulation circuit 451c.

The switch circuit 451d is able to connect the regulation circuit 451c and the battery 451e. The switch circuit 451d may maintain the on/off state under the control of the control circuit 452.

When the switch circuit 451d is in the on state, the battery 451e is capable of being charged with power supplied from the regulation circuit portion 451c.

The sensing circuit 454 may sense a change in the charging state of the power received by the wireless power reception device 21 or 22. For example, the sensing circuit 454 may periodically or non-periodically measure the current/voltage value received by the loop coil 451L through the predetermined current/voltage sensor 454a. The wireless power reception device 21 or 22 may calculate the amount of power received by the external wireless power reception device 21 or 22 on the basis of the measured current/voltage.

The sensing circuit 454 may sense a change in the charging environment of the wireless power reception device 21 or 22. For example, the sensing circuit 454 may periodically or non-periodically measure at least one of the internal temperature and the external temperature of the wireless power reception device 21 or 22 through a predetermined temperature sensor 454b. The sensing circuit 454 may periodically or non-periodically measure the illuminance (brightness) around the wireless power reception device 21 or 22 through a predetermined illuminance sensor 454c. The sensing circuit 454 may periodically or non-periodically measure the sound (noise) level around the wireless power reception device 21 or 22 through a predetermined sound sensor 454d.

Figure 15:
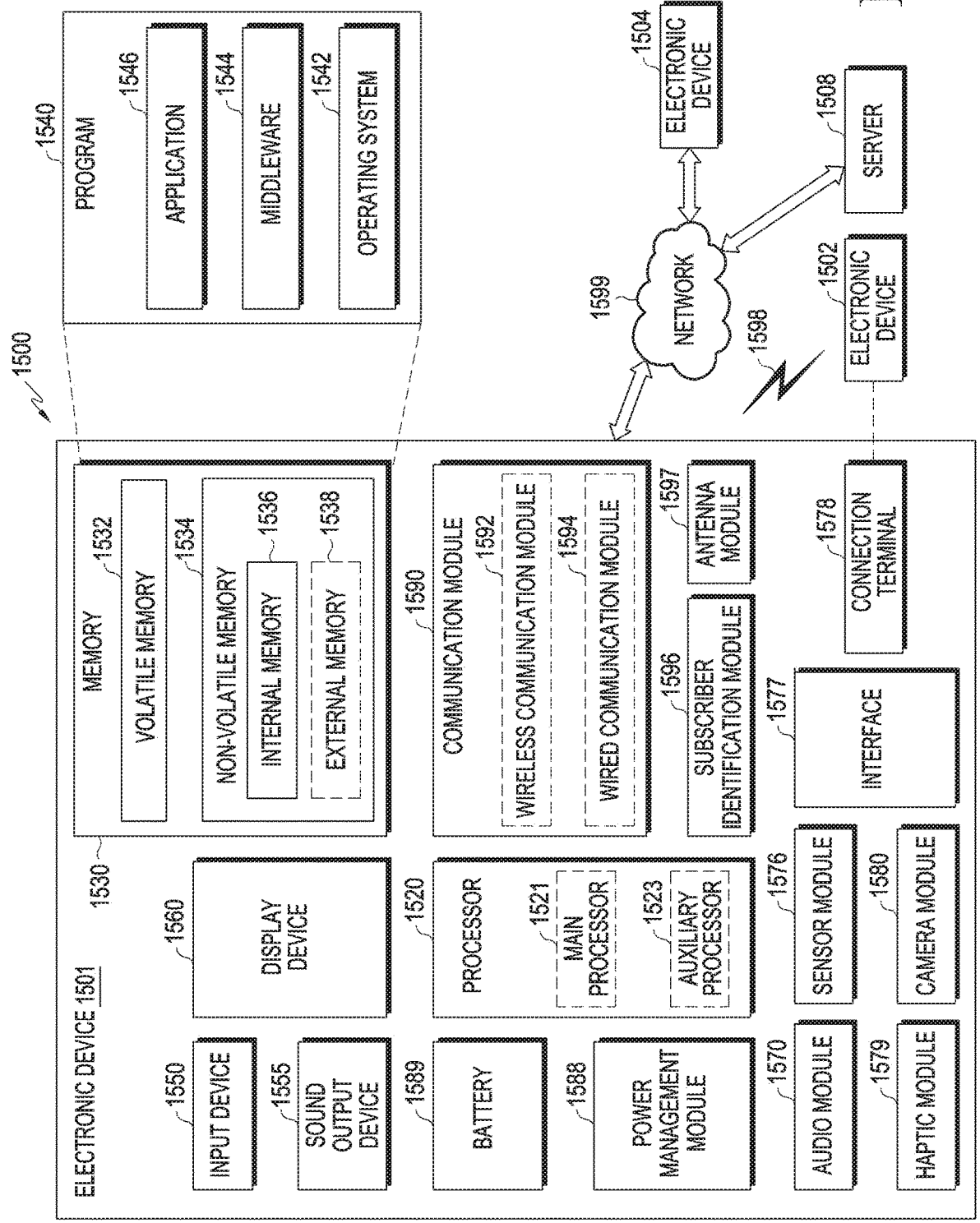
FIG. 15 is a block diagram of an electronic device in a network environment, according to various embodiments of the disclosure.

FIG. 15 is a block diagram illustrating an electronic device 1501 in a network environment 1500 according to various embodiments of the disclosure.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a CPU or an AP), and an auxiliary processor 1523 (e.g., a graphics processing unit (GPU), an ISP, a sensor hub processor, or a CP) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an ISP or a CP) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 150, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a HDMI, a USB interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, ISP, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more CP that are operable independently from the processor 1520 (e.g., the AP) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 10 in FIGS. 1 and 2) according to various embodiments may include a coil unit (e.g., the coil unit 200 in FIG. 2), a power transmission circuit (e.g., the power transmission circuit 500 in FIG. 2) electrically connected to the coil unit, and a control circuit (e.g., the control circuit of the circuit board 400 in FIG. 2) set to wirelessly transmit power using the coil unit, and the coil unit may include a first coil (e.g., the first coil 210 in FIG. 2). The first coil may include a first layer (e.g., the first layer 211 in FIG. 3) wound in a first shape specified by a first number of turns, and a second layer (e.g., the second layer 212 in FIG. 3) extending from the first layer and wound in a second shape specified by a second number of turns, the second layer being disposed on the first layer to overlap the first layer.

According to various embodiments, the first shape of the first layer and the second shape of the second layer include a helical wire, and may include a shape of a part of at least one of a circle, an ellipse, or a polygon.

According to various embodiments, the first number of turns of the first layer may be larger than the second number of turns of the second layer, and the diameter of the helical wire forming the first layer may correspond to the diameter of the wire forming the second layer.

According to various embodiments, the outer diameter of the first layer may be larger than the outer diameter of the second layer, and the inner diameter of the first layer may be larger than the inner diameter of the second layer, and the central axis of the first layer and the central axis of the second layer may be arranged on the same line.

According to various embodiments, at least a portion of the second layer may be provided to be exposed inside a central opening of the first layer when viewed from above the first layer.

An electronic device (e.g., the electronic device 10 in FIGS. 1 and 2) according to various embodiments may include a coil unit, a power transmission circuit electrically connected to the coil unit, and a control circuit set to wirelessly transmit power using the coil unit. The coil unit (e.g., the coil unit 200 in FIG. 6) may include: a first coil (e.g., the first coil 210 in FIG. 6) wound in a first shape specified by a first number of turns, the first shape including a first layer (e.g., the first layer 211 in FIG. 6) and a second layer (e.g., the second layer 212 in FIG. 6) having an area narrower than the area of the first layer; and a second coil (e.g., the second coil 220 in FIG. 6) wound in a second shape specified by a second number of turns, the second coil being disposed above the first layer to overlap at least a portion of the first layer.

According to various embodiments, the second shape may include a third layer (e.g., the third layer 221 in FIG. 10) and a fourth layer (e.g., the fourth layer 222 in FIG. 6) having an area wider than the area of the third layer, and the second layer and the fourth layer may be substantially coplanar with each other.

According to various embodiments, the fourth layer may be disposed above the first layer to overlap at least a portion of the first layer.

According to various embodiments, the second shape may include a third layer disposed to be substantially coplanar with the second layer, and the first layer, the second layer, and the third layer may include a helical wire, and may include a shape of a part of at least one of a circle, an ellipse, or a polygon.

According to various embodiments, the first number of turns of the first layer may be larger than the second number of turns of the second layer, and a region adjacent to the inner diameter of the first layer is disposed to overlap the second layer, and a region adjacent to the outer diameter of the first layer is disposed to overlap the third layer.

According to various embodiments, the diameter of the helical wire forming the first layer or the second layer may differ from the diameter of the wire forming the third layer.

According to various embodiments, the second coil may be a coil conforming to a WPC standard.

According to various embodiments, the outer diameter of the third layer may be larger than the outer diameter of the first layer, the inner diameter of the third layer may be larger than the outer diameter of the second layer, and the second layer may be disposed to be embedded inside the inner diameter of the third layer.

According to various embodiments, the outer diameter of the first layer may be larger than the outer diameter of the second layer, the inner diameter of the first layer may be larger than the inner diameter of the second layer, and the central axis of the first layer, the central axis of the second layer, and the central axis of the third layer may be arranged on the same line.

According to various embodiments, the electronic device may further include an housing through which the power transmission region (e.g., the coil-mounting region 111 in FIG. 2) is exposed, and the power transmission region may include a first region facing the first coil and a second region facing the second coil, and an electronic device wirelessly charged through the first region and an electronic device receiving wireless power through the second region may differ from each other.

According to various embodiments, the electronic device may further include a shielding member (e.g., the shielding member 300 in FIG. 2) disposed to face the power transmission region with reference to the coil unit, and configured to shield a magnetic field generated from the coil unit such that the magnetic field is not directed to the inside of the housing.

According to various embodiments, the central axis of the first layer and the central axis of the second layer may be arranged on the same line, the central axis of the third layer and the central axis of the fourth layer may be arranged on the same line, and the central axis of the first layer and the central axis of the third layer may be arranged on the same line.

According to various embodiments disclosed herein, an electronic device may include a power transmission circuit set to generate power to be wirelessly transmitted, and a coil assembly (e.g., the coil unit 200 in FIG. 10) electrically connected to the power transmission circuit and configured to wirelessly transmit the power. The coil assembly may include: a first coil module (e.g., the first coil 210 in FIG. 10) including a first coil (e.g., the first coil 210 in FIG. 10) wound by a first number of turns, and a second coil (e.g., the second coil 220 in FIG. 10) wound by a second number of turns smaller than the first number of turns in the state of being electrically connected to the first coil and disposed above the first coil; and a second coil module (e.g., the second coil 220 in FIG. 10) including a third coil (e.g., the third coil 230 in FIG. 13) wound by a third number of turns and disposed above the first coil adjacent to the second coil in the state in which a portion thereof overlaps the first coil, and a fourth coil (not illustrated) wound by a fourth number of turns smaller than the third number of turns in the state of being electrically connected to the third coil and disposed below the third coil adjacent to the first coil.

According to various embodiments, the first coil and the fourth coil may be substantially coplanar with each other, and the second coil and the third coil may be substantially coplanar with each other.

According to various embodiments, the coil assembly may further include: a third coil module (e.g., the third coil 230 in FIG. 11) including a fifth coil (not illustrated) wound by a fifth number of turns and disposed adjacent to the fourth coil in the state in which a portion thereof overlaps the third coil, and a sixth coil (not illustrated) wound by a sixth number of turns smaller than the fifth number of turns in the state of being electrically connected to the fifth coil and disposed above the fifth coil adjacent to the third coil.

According to various embodiments disclosed herein, an electronic device may include: a power transmission circuit set to generate power to be wirelessly transmitted, and a coil assembly electrically connected to the power transmission circuit and configured to wirelessly transmit the power. The coil assembly may include a first coil wound by a first number of turns, a second coil wound by a second number of turns smaller than the first number of turns and disposed above the first coil, a third coil wound by a third number of turns and disposed above the first coil adjacent to the second coil in the state in which a portion thereof overlaps the first coil, and a fourth coil wound by a fourth number of turns smaller than the third number of turns and disposed below the third coil adjacent to the first coil.

While the disclosure has been shown and described with reference to various embodiments thereof, it will be understood by those skilled in the art various changes in form and details may be made therein without departing from the spirit and scope of the disclosure as defined by the appended claims and their equivalents.

What is claimed is:

1. An electronic device comprising:
    a coil unit;
    a power transmission circuit electrically connected to the coil unit; and
    a control circuit configured to wirelessly transmit power using the coil unit,
    wherein the coil unit includes a first coil and a second coil,
    wherein the first coil includes:
        a first layer including a first helical wire wound in a first shape by a first number of turns, and
        a second layer including a second helical wire extending from the first layer and wound in a second shape by a second number of turns, the second layer being disposed above the first layer to overlap the first layer,
    wherein the second coil includes a third helical wire wound in a third shape by a third number of turns,
    wherein the third shape includes a third layer disposed to be substantially coplanar with the second layer, and
    wherein a diameter of the first helical wire forming the first layer or the second helical wire forming the second layer differs from a diameter of the third helical wire forming the third layer.

2. The electronic device of claim 1, wherein the first shape of the first layer and the second shape of the second layer include a shape of a part of at least one of a circle, an ellipse, or a polygon.

3. The electronic device of claim 2,
    wherein the first number of turns of the first layer is larger than the second number of turns of the second layer, and
    wherein a diameter of the helical wire forming the first layer corresponds to a diameter of the helical wire forming the second layer.

4. The electronic device of claim 2,
    wherein an outer diameter of the first layer is larger than an outer diameter of the second layer, and an inner diameter of the first layer is larger than an inner diameter of the second layer, and
    wherein a central axis of the first layer and a central axis of the second layer are arranged on a same line.

5. The electronic device of claim 2, wherein at least a portion of the second layer is configured to be exposed inside a central opening of the first layer when viewed from above the first layer.

6. An electronic device comprising:
    a coil unit;
    a power transmission circuit electrically connected to the coil unit; and
    a control circuit configured to wirelessly transmit power using the coil unit,
    wherein the coil unit includes:
        a first coil including a first helical wire wound in a first shape by a first number of turns, the first shape including a first layer and a second layer having an area narrower than the area of the first layer, and
        a second coil including a second helical wire wound in a second shape by a second number of turns, the second coil being disposed above the first layer to overlap at least a portion of the first layer,
    wherein the second shape includes a third layer disposed to be substantially coplanar with the second layer, and
    wherein a diameter of the helical wire forming the first layer or the second layer differs from a diameter of the helical wire forming the third layer.

7. The electronic device of claim 6,
    wherein the second shape including a third layer and a fourth layer having an area wider than an area of the third layer, and
    wherein the second layer and the fourth layer are substantially coplanar with each other.

8. The electronic device of claim 7, wherein the fourth layer is disposed above the first layer to overlap at least a portion of the first layer.

9. The electronic device of claim 6,
    wherein the first layer, the second layer, and the third layer include a shape of a part of at least one of a circle, an ellipse, or a polygon.

10. The electronic device of claim 9,
    wherein the first number of turns of the first layer is larger than the second number of turns of the second layer,
    wherein a region adjacent to an inner diameter of the first layer is disposed to overlap the second layer, and a region adjacent to an outer diameter of the first layer is disposed to overlap the third layer.

11. The electronic device of claim 6, wherein the second coil includes a coil based on a wireless power consortium (WPC) standard.

12. The electronic device of claim 10,
    wherein the outer diameter of the third layer is larger than an outer diameter of the first layer, and the inner diameter of the third layer is larger than an outer diameter of the second layer, and wherein the second layer is disposed to be embedded inside an inner diameter of the third layer.

13. The electronic device of claim 12,
wherein the outer diameter of the first layer is larger than the outer diameter of the second layer, and an inner diameter of the first layer is larger than an inner diameter of the second layer, and
wherein a central axis of the first layer, a central axis of the second layer, and a central axis of the third layer are arranged on a same line.

14. The electronic device of claim 6, further comprising:
a housing including a power transmission region disposed therein,
wherein the power transmission region includes a first region facing the first coil and a second region facing the second coil, and
wherein the first region and the second region are for wirelessly charging different devices.

15. The electronic device of claim 14, further comprising:
a shielding member disposed to face the power transmission region with respect to the coil unit, and configured to shield a magnetic field generated from the coil unit such that the magnetic field is not directed to an inside of the housing.

16. The electronic device of claim 8,
wherein a central axis of the first layer and a central axis of the second layer are arranged on a same line,
wherein a central axis of the third layer and a central axis of the fourth layer are arranged on a same line, and
wherein the central axis of the first layer and the central axis of the third layer are arranged on a same line.

17. An electronic device comprising:
a power transmission circuit configured to generate power; and
a coil assembly electrically connected to the power transmission circuit and configured to wirelessly transmit the power,
wherein the coil assembly includes:
a first coil module including a first helical wire forming a first coil wound by a first number of turns, and a second helical wire forming a second coil wound by a second number of turns smaller than the first number of turns, the second coil being electrically connected to the first coil and disposed above the first coil, and
a second coil module including a third helical wire forming a third coil wound by a third number of turns and disposed above the first coil adjacent to the second coil, a portion of the third coil overlapping the first coil, and a fourth helical wire forming a fourth coil wound by a fourth number of turns smaller than the third number of turns, the fourth coil being electrically connected to the third coil and disposed below the third coil adjacent to the first coil, and
wherein a diameter of the first helical wire forming the first coil or the second helical wire forming the second coil differs from a diameter of the third helical wire forming the third coil or the fourth helical wire forming the fourth coil.

18. The electronic device of claim 17,
wherein the first coil and the fourth coil are substantially coplanar with each other, and
wherein the second coil and the third coil are substantially coplanar with each other.

19. The electronic device of claim 17, wherein the coil assembly further includes a third coil module including a fifth coil wound by a fifth number of turns and disposed adjacent the fourth coil, a portion of the fifth coil overlapping the third coil, and a sixth coil wound by a sixth number of turns smaller than the fifth number of turns, the sixth coil being electrically connected to the fifth coil and disposed above the fifth coil adjacent to the third coil.

20. The electronic device of claim 17, further comprising a sensor configured to sense a wireless power reception device.

* * * * *